(12) United States Patent
Wu et al.

(10) Patent No.: US 10,639,876 B2
(45) Date of Patent: May 5, 2020

(54) SOLVENT-CONTAINING DRY FILM AND METHOD FOR APPLYING THE SAME ON A SUBSTRATE

(71) Applicant: ETERNAL MATERIALS CO., LTD., Kaohsiung (TW)

(72) Inventors: Chung-Jen Wu, Kaohsiung (TW);
Meng-Yen Chou, Kaohsiung (TW);
Yi-Chung Shih, Kaohsiung (TW);
Meng-Tso Chen, Kaohsiung (TW);
Chih-Ming An, Kaohsiung (TW);
Chang-Hong Ho, Kaohsiung (TW);
Shih-Chieh Yeh, Kaohsiung (TW);
Shun-Jen Chiang, Kaohsiung (TW);
Po-Yu Huang, Kaohsiung (TW);
Shu-Wan Lu, Kaohsiung (TW)

(73) Assignee: ETERNAL MATERIALS CO., LTD., Kaohsiung (TW)

(*) Notice: Subject to any disclaimer, the term of this patent is extended or adjusted under 35 U.S.C. 154(b) by 0 days.

(21) Appl. No.: 14/803,291

(22) Filed: Jul. 20, 2015

(65) Prior Publication Data
US 2016/0017105 A1 Jan. 21, 2016

(30) Foreign Application Priority Data
Jul. 18, 2014 (TW) .............................. 103124858 A

(51) Int. Cl.
*B32B 37/20* (2006.01)
*B32B 37/00* (2006.01)
(Continued)

(52) U.S. Cl.
CPC .......... *B32B 37/203* (2013.01); *B32B 27/281* (2013.01); *B32B 37/003* (2013.01);
(Continued)

(58) Field of Classification Search
CPC ... B32B 37/203; B32B 27/281; B32B 37/003; B32B 27/24; B32B 2457/00;
(Continued)

(56) References Cited

U.S. PATENT DOCUMENTS 4,880,895 A * 11/1989 Higashi .............. C08G 73/1032
528/125
5,507,903 A * 4/1996 Yamamori .......... H01L 21/4846
156/229
(Continued)

FOREIGN PATENT DOCUMENTS

CN 1959440 A 5/2007
CN 100363426 C 1/2008
(Continued)

OTHER PUBLICATIONS

Office Action of the Taiwan Intellectual Property Office, dated Sep. 23, 2015.
(Continued)

*Primary Examiner* — John D Freeman
(74) *Attorney, Agent, or Firm* — Ladas & Parry LLP

(57) ABSTRACT

The present disclosure relates to a solvent-containing dry film and a method for applying a dry film on a substrate. The dry film includes a carrier and a resin layer. The resin layer contains a resin composition and a solvent and the solvent is present in a total amount of at least 5 wt % based on the total weight of the resin layer. The dry film of the present invention can be applied onto a substrate without the use of a prior art vacuum lamination apparatus. The application process is simple and is more cost-efficient than the prior art techniques.

7 Claims, 1 Drawing Sheet

(51) Int. Cl.
*C08J 5/18* (2006.01)
*B32B 27/28* (2006.01)
*B32B 27/24* (2006.01)

(52) U.S. Cl.
CPC ............... *C08J 5/18* (2013.01); *B32B 27/24* (2013.01); *B32B 2457/00* (2013.01); *B32B 2457/14* (2013.01); *B32B 2457/20* (2013.01); *C08J 2379/08* (2013.01); *Y10T 428/31721* (2015.04)

(58) Field of Classification Search
CPC .... B32B 2457/14; B32B 2547/20; C08J 5/18; C08J 2379/08; C08J 7/0427; C08J 2367/02; C08J 2479/08; C08L 79/08; G03F 7/037; H05K 3/0076; H05K 3/287; Y10T 428/31721
See application file for complete search history.

(56) References Cited

U.S. PATENT DOCUMENTS

| | | | |
|---|---|---|---|
| 2006/0063908 A1* | 3/2006 | Moriuchi | C08G 73/10 528/310 |
| 2006/0210819 A1 | 9/2006 | Dueber | |
| 2007/0129533 A1* | 6/2007 | Kaneshiro | B29C 41/28 528/353 |
| 2010/0187719 A1* | 7/2010 | Oishi | B29C 41/26 264/216 |
| 2015/0299513 A1* | 10/2015 | Kelly | C09D 179/08 524/96 |

FOREIGN PATENT DOCUMENTS

| | | |
|---|---|---|
| CN | 101492540 A | 7/2009 |
| CN | 101675386 A | 3/2010 |
| CN | 102532544 A | 7/2012 |
| EP | 2590025 A1 | 5/2013 |
| JP | 2003057812 A | 2/2003 |
| JP | 2006220886 A | 8/2006 |
| JP | 2006-259700 A | 9/2006 |
| JP | 2007-310201 A | 11/2007 |
| JP | 2007310201 A | 11/2007 |
| JP | 2008-281597 A | 11/2008 |
| JP | 2008281597 A | 11/2008 |
| JP | 2010-169944 A | 8/2010 |
| TW | 201300442 | 1/2013 |
| TW | 201425469 A | 7/2014 |

OTHER PUBLICATIONS

Office Action of the Taiwan Intellectual Property Office, dated Dec. 30, 2015.
Decision to Grant a Patent Issued by the Taiwan Intellectual Property Office, dated Mar. 29, 2016.
Espacenet machine translation of CN 1959440 A.
Espacenet machine translation of TW 201300442.
Espacenet machine translation of CN 101492540 A.
Espacenet machine translation of TW 201425469 A.
Japanese Office Action dated Jul. 25, 2016 for Japanese Application No. 2015-143939.
Japanese Patent Office English abstract of JP 2008-281597 A.
Japanese Patent Office English abstract of JP 2007-310201 A.
Japanese Patent Office English abstract of JP 2010-169944 A.
Machine English translation of CN100363426C.
Machine English translation of CN101675386A.
Machine English translation of CN102532544A.
Machine English translation of JP2003057812A.
Machine English translation of 2006220886A.
Machine English translation of JP2007310201A.
Machine English translation of JP2008281597A.
An Office Action dated Jul. 17, 2019 in foreign counterpart German Patent Application 10 2015 213 634.5 with English translation thereof.

* cited by examiner

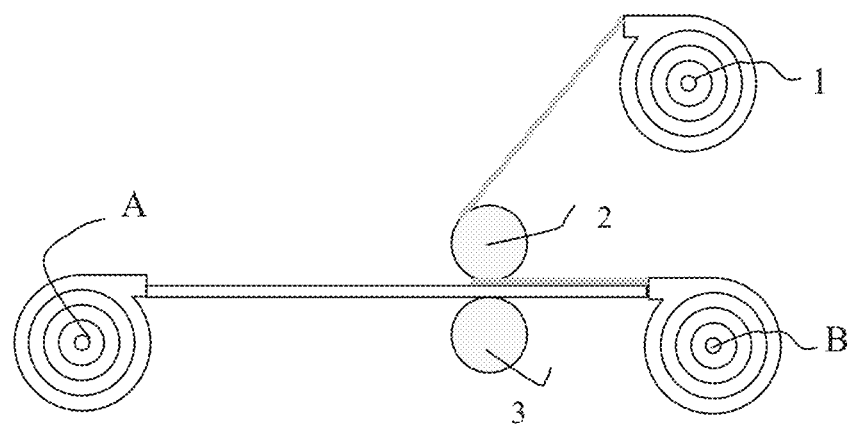

SOLVENT-CONTAINING DRY FILM AND METHOD FOR APPLYING THE SAME ON A SUBSTRATE

FIELD OF THE INVENTION

The present invention relates to a solvent-containing dry film, particularly a dry film containing a polyimide layer. The present invention also relates to a method for applying a solvent-containing dry film on a substrate.

DESCRIPTION OF THE RELATED ART

In recent years, it has been emphasized that electronic products should be lighter, thinner, shorter and smaller, and thus the size of various electronic parts and components has to be reduced much more. Under such a development trend, there is more room to develop a flexible printed circuit (FPC) board which has lightness, thinness, high temperature resistance and other characteristics and may be produced abundantly. The flexible printed circuit board may be found in various electronic products which are popular nowadays, such as mobile phones, liquid crystal displays, and organic light-emitting diodes. The flexible printed circuit board is produced by arranging circuits and other electronic components on a flexible substrate, which, compared to a printed circuit board using a conventional silicon substrate or glass substrate, has better flexibility, and thus may also be referred to as a soft board.

Usually, a coverlay is applied to a surface of the soft board as an insulation protection layer to protect copper circuits on the surface of the soft board and improve the bending-proof performance of the circuit. A suitable material of the coverlay is required to have better heat resistance, dimensional stability, insulation performance, and chemical resistance.

Generally, a method for laminating a coverlay to a soft board comprises following steps: firstly processing the coverlay into a specified shape such that the overlay has openings to expose the circuits on the soft board; applying an adhesive layer to a surface of the coverlay; and then aligning the coverlay with corresponding positions of the soft board to implement lamination. However, the above method requires conducting the procedures, such as processing and openings formation on a very thin coverlay, and the lamination of the coverlay to the soft board substantially relies on manual operation. Therefore, it results in the problems, such as low yield of the process and a high cost, thus failing to satisfy requirements for high precision assembly. In addition, a problem of adhesive overflow (adhesive bleeding) exists.

In order to overcome the above problems, it has been known that a photo-imageable coverlay (referred to as PIC) may be used for improvement. The photo-imageable coverlay does not require pre-forming openings, but when the photo-imageable coverlay is laminated to a patterned circuit board, undesired gas may remain between the patterned circuit board and the photo-imageable coverlay, thus affecting reliability and quality of final products. In order to remove the gas between the circuit board and the photo-imageable coverlay, a vacuum lamination apparatus (for example, a vacuum laminator or a vacuum hot press machine) is generally used, which firstly discharges the air and is then pressurized for lamination. However, in most cases, the method that uses the vacuum lamination apparatus can only achieve lamination in a single-sheet manner, i.e., it is necessary to pause for a period of time after each lamination so as to remove a test piece that has been laminated and replace it with another test piece. The method that uses the vacuum lamination apparatus is not only time-consuming and fails to satisfy an objective of rapid production and but is also not cost-efficient due to high cost of the apparatus.

Additionally, the photo-imageable coverlay commonly used in the industry is mainly a photo-imageable dry film solder mask (referred to as DFSM), which is mostly composed of an epoxy resin or an acrylate resin. However, the coverlay made from the epoxy resin or the acrylate resin may not be applied to high-level products due to insufficient heat resistance, insulativity, chemical resistance or mechanical strength.

SUMMARY OF THE INVENTION

In view of the above, the present invention provides a novel solvent-containing dry film which has superior heat resistance, insulativity, chemical resistance and mechanical strength. The dry film of the present invention can be applied onto a substrate without the use of a prior art vacuum lamination apparatus; the application process is simple and is more cost-efficient than the prior art process.

The present invention further provides a method for applying a dry film on a substrate, which can effectively solve the problems of time-consuming and higher cost when a vacuum lamination apparatus is used for lamination.

The present invention provides a solvent-containing dry film comprising a carrier and a resin layer, wherein the resin layer comprises a resin and a solvent, and the solvent is present in a total amount of at least 5 wt % based on the total weight of the resin layer.

The present invention also provides a method for applying a dry film on a substrate, which comprises: laminating the dry film to the substrate in a manner that the resin layer of the dry film faces the substrate.

The dry film of the present invention can be applied onto a substrate without the use of a prior art vacuum lamination apparatus. The application process is simple, can be carried out with equipment available in the art and is more cost-efficient than the prior art process; the dry film has superior heat resistance, insulativity, chemical resistance and mechanical strength and can be applied to high-level products.

BRIEF DESCRIPTION OF THE DRAWINGS

FIG. 1 is a schematic diagram of a roll-to-roll process.

DETAILED DESCRIPTION OF THE INVENTION

In order to facilitate the understanding of the disclosure herein, terms are hereby defined below.

The term "about" refers to an acceptable deviation of a given value measured by a person of ordinary skill in the art, depending, in part, on how to measure or determine the value.

In the present invention, the term "alkyl" refers to a saturated, straight or branched alkyl, which comprises preferably 1-30 carbon atoms, and more preferably 1-20 carbon atoms. Examples include (but are not limited to) methyl, ethyl, n-propyl, isopropyl, n-butyl, isobutyl, tert-butyl, amyl, hexyl and similar groups.

In the present invention, the term "alkenyl" refers to an unsaturated, straight or branched alkyl containing at least one carbon-carbon double bond, which comprises preferably 2-30 carbon atoms, and more preferably 10-20 carbon atoms. Examples include (but are not limited to) ethenyl, propenyl, methyl propenyl, isopropenyl, pentenyl, hexenyl, heptenyl, 1-propenyl, 2-butenyl, 2-methyl-2-butenyl and similar groups.

In the present invention, the term "alkynyl" refers to an unsaturated, straight or branched alkyl containing at least one carbon-carbon triple bond, which comprises preferably 2-30 carbon atoms, and more preferably 10-20 carbon atoms. Examples include (but are not limited to) ethynyl, propargyl, 3-methyl-1-pentynyl, 2-heptynyl and similar groups.

In the present invention, the term "aryl" or "aromatic compound" refers to an aromatic ring system comprising a 6-carbon monocyclic ring, a 10-carbon bicyclic ring, or a 14-carbon tricyclic ring. Examples of the aryl include (but are not limited to) phenyl, tolyl, naphthyl, fluorenyl, anthryl, phenanthrenyl and similar groups.

In the present invention, the term "halogenated alkyl" refers to an alkyl substituted with a halogen, wherein the "halogen" denotes fluorine, chlorine, bromine or iodine, preferably fluorine or chlorine.

In the present invention, the term "alkoxy" refers to an alkyl attached to an oxygen atom. Examples include (but not limited to) methoxy, ethoxy, propoxy, isopropoxy, n-butoxy, isobutoxy, pentoxy, hexyloxy, benzyloxy, fluorenyloxy and similar groups.

In the prior art, in order to prevent the dry film from generating a volatile organic compound with high concentration during usage of the dry film and to reduce the phenomenon of excessive glue (bleeding) caused by the flowing of the coated glue (i.e., the resin layer) during storage of the dry film, a semi-product of the dry film that has been coated is sent to an oven for drying the resin layer and fully adhering the resin layer to the carrier. The organic solvent is almost completely volatilized at this step. Therefore, the content of the organic solvent in conventional dry film products is generally less than 1 wt %.

In addition, a bubble phenomenon is commonly observed when the dry film is applied to the lamination process of a flexible printed circuit board. The existence of bubbles will cause abnormal quality of the dry film and thus affect performance of the circuit board. As a result, a vacuum lamination apparatus is generally used to remove the air. However, as mentioned above, vacuum lamination apparatus are not cost-efficient.

The present invention provides a solvent-containing dry film, comprising a carrier and a resin layer, wherein the resin layer comprises a resin and a solvent. When the solvent is present in a total amount of at least 5 wt % based on the total weight of the resin layer, the dry film has a bubble-dissolving effect, which may enable the air between a substrate and a dry film to dissolve in the solvent contained in the dry film during lamination, thus solving the problem of bubbles generated by the dry film during the lamination process of the flexible printed circuit board.

The carrier used in the present invention can be any carrier known to persons having ordinary skill in the art, such as glass or plastic. The plastic carrier is not particularly limited, which includes, for example, but is not limited to, polyester resins, such as polyethylene terephthalate (PET) and polyethylene naphthalate (PEN); polymethacrylate resins, such as polymethyl methacrylate (PMMA); polyimide resins; polystyrene resins; polycycloolefin resins; polyolefin resins; polycarbonate resins; polyurethane resins; triacetate cellulose (TAC); or a mixture thereof. The preferred carriers are polyethylene terephthalate, polymethyl methacrylate, polycycloolefin resin, or triacetate cellulose, or a mixture thereof. More preferably, the carrier is polyethylene terephthalate. The thickness of the carrier is preferably in the range from about 16 μm to about 250 μm, usually depending on the purpose of a desired optical product.

There is no special limitation to the type of the resin for used in the resin layer, which may be, for instance, an acrylate resin, an epoxy resin, a polyetherimide (PEI) resin or a polyimide resin. When applied to a process at a high temperature above 350° C., the resin is preferably a polyimide resin.

Through extensive studies and repeated experiments, the inventors of the present invention have found that, the solvent in the dry film of the present invention is present, based on the total weight of the resin layer, in a total amount of at least 5 wt % and preferably in a total amount of 15 wt % to 60 wt % so as to more effectively solve the problem of bubbles generated by the dry film during the lamination of the dry film to a flexible printed circuit board. The solvent is present more preferably in a total amount of 15 wt % to 50 wt %, and most preferably in a total amount of 15 wt % to 47 wt %; generally, the lower limit can be 20 wt %. In one embodiment of the present invention, when the content of the solvent is too low (for example, lower than 15 wt %, or even lower than 5 wt %), the dry film is prone to become rigid and brittle and is hardly laminated to a soft board, thus reducing the bubble-dissolving effect during the lamination process and easily causing a phenomenon of re-bubbling (i.e., the recurrence of bubbles after being dissolved). However, when the content of the solvent is too high, especially greater than 60 wt %, the surface of the dry film becomes sticky and the operability is worse and a better bubble-dissolving effect cannot be achieved as expected during the lamination process.

According to one preferred embodiment of the present invention, the solvent used in the present invention comprises at least one solvent having a gas-dissolving effect. The solvent having a gas-dissolving effect can dissolve undesired gas located between the resin layer and the substrate, and therefore, the dry film has a gas-dissolving effect so it can reduce undesired phenomenon due to the existence of the air between the resin layer and the substrate and solve the problem of bubbles generated during the lamination process of the dry film to the substrate, without using a vacuum lamination apparatus. The aforementioned solvent having a gas-dissolving effect is present in an amount between 5 wt % to 60 wt %, preferably between 6 wt % to 45 wt %, more preferably between 7 wt % to 40 wt %, based on the total weight of the resin layer.

The aforementioned solvent having a gas-dissolving effect is preferably selected from a first solvent, a second solvent and a combination thereof, wherein the first solvent and the second solvent are defined below.

The dry film of the present invention is applicable to print circuit boards as a dry film solder mask or a cover layer for protecting the coatings on print circuit boards or is applicable to the surface of semiconductor packages. The layer formed by the dry film of the present invention is electrically insulated, can protect circuits and can achieve excellent effects such as the prevention of circuit oxidation and solder short.

Moreover, the dry film of the present invention has high resolution, high developing rate, electrolysis plating resistance, electroless plating resistance, high temperature endurance, high humidity endurance, etc. Therefore, the dry film of the present invention can also be used as a photoresist in a manufacture process relevant to print circuit boards or wafers.

According to one preferred embodiment of the present invention, the solvent-containing dry film is a polyimide dry film comprising a carrier and a polyimide layer (a resin layer). The carrier is as defined above and is preferably polyethylene terephthalate. The polyimide layer can be a photosensitive or non-photosensitive polyimide layer. Preferably, the polyimide layer is a photosensitive polyimide layer. The polyimide layer comprises a polyimide resin and a solvent, wherein the polyimide resin may be a polyimide precursor or a soluble polyimide or a combination thereof, the species of such are defined below. The solvent is present in a total amount of at least 5 wt %, preferably between 15 wt % to 60 wt %, more preferably between 15 wt % to 50 wt %, particularly preferably between 15 wt % to 47 wt %, based on the total weight of the resin layer; generally, the lower limit can be 20 wt %. The solvent has a gas-dissolving effect and is selected from a first solvent, a second solvent and a combination thereof, wherein the first solvent and the second solvent are defined below.

Leveling property of the polyimide layer is affected by a glass transition temperature thereof. A higher glass transition temperature results in poor leveling property of the polyimide layer, and therefore, it is difficult to carry out lamination but easy to produce undissolved bubbles during the lamination process. With a lower glass transition temperature, the polyimide layer is prone to become sticky during the lamination process, which leads to poor operability. The aforementioned solvent also has a function of adjusting the glass transition temperature of the polyimide layer. According to one embodiment of the present invention, the polyimide layer in the present invention has a glass transition temperature preferably between −10° C. and 20° C., and more preferably between 0° C. and 15° C.

(a) Polyimide Precursor or Soluble Polyimide

Polyimide Precursor

There is no special limitation to a polyimide precursor used in the present invention, which may be well known by a person of ordinary skill in the art, such as a polyamic acid, a polyamide ester, any material capable of generating polyimide through reaction, or a mixture thereof. Various polyimide precursors have been developed in the art.

For instance, those disclosed in ROC (Taiwan) Patent Application No. 095138481, No. 095141664, No. 096128743, No. 097151913 or No. 100149594, the contents of which are hereby incorporated for reference in their entity.

Polyimide precursor mainly has a repeating unit of formula (A):

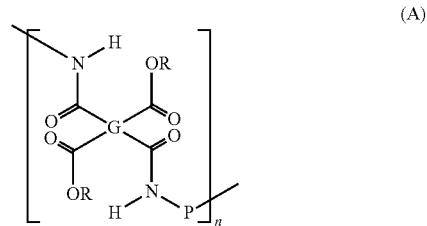

wherein G is a tetravalent organic group;

P is a divalent organic group;

R is $C_1$-$C_{14}$ alkyl, $C_6$-$C_{14}$ aryl, $C_6$-$C_{14}$ aralkyl, a phenolic group or an ethylenically unsaturated group; and n is an integer greater than 0, preferably an integer from 1 to 1000.

Optionally, the polyimide precursor may be modified with different substituents/groups. For example, a photosensitive polyimide precursor can be prepared by using photosensitive groups; the reactivity of a polyimide precursor or the properties of a polyimide prepared therefrom can be altered by adjusting the end groups bonded to the repeating unit of formula (A).

ROC (Taiwan) Patent Application No. 100149594 discloses polyimide precursors having one of the repeating units of formulae (1) to (4):

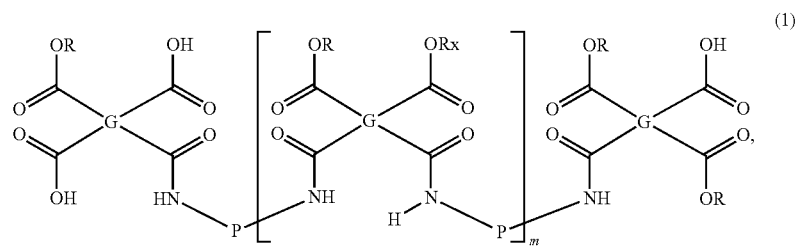

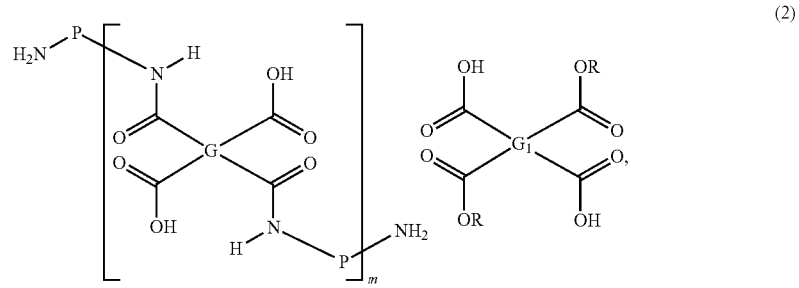

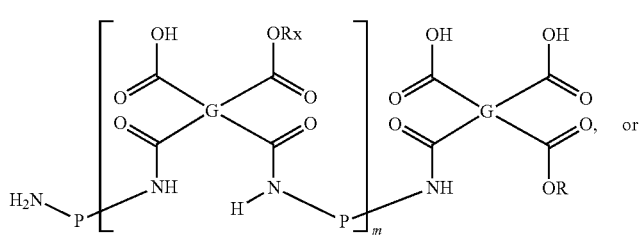

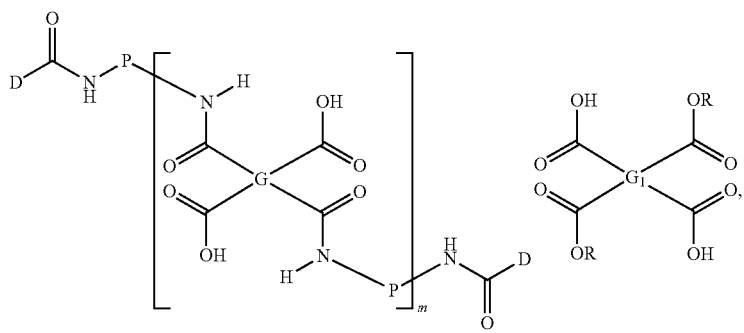

wherein $G_1$ independently represents a tetravalent organic group;
each $R_x$ independently represents H or an ethylenically unsaturated group;
each D independently represents a nitrogen-containing heterocyclic group or an —OR* group,
wherein R* is $C_1$-$C_{20}$ alkyl;
each m is an integer from 0 to 100, preferably an integer from 5 to 50, more preferably an integer from 10 to 25; and
G, P and R are as defined as above.

The ethylenically unsaturated group is not particularly limited, examples thereof including, but not limited to, ethenyl, propenyl, methylpropenyl, n-butenyl, isobutenyl, ethenylphenyl, propenylphenyl, propenyloxymethyl, propenyloxyethyl, propenyloxypropyl, propenyloxybutyl, propenyloxypentyl, propenyloxyhexyl, methylpropenyloxymethyl, methylpropenyloxyethyl, methylpropenyloxypropyl, methylpropenyloxybutyl, methylpropenyloxypentyl, methylpropenyloxyhexyl, a group of the following formula (5) and a group of the following formula (6):

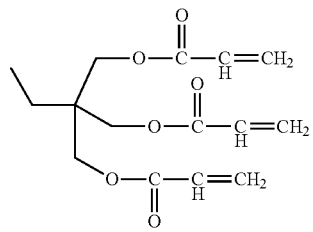

wherein $R_{12}$ is phenylene, $C_1$-$C_8$ alkylene, $C_2$-$C_8$ alkenylene, $C_3$-$C_5$ cycloalkylene or $C_1$-$C_8$ hydroxylalkylene; and $R_{13}$ is hydrogen or $C_1$-$C_4$ alkyl. Among others, the preferred group of formula (6) is selected from a group consisting of

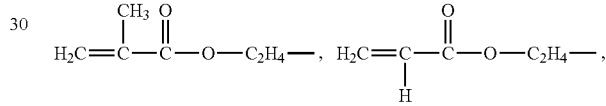

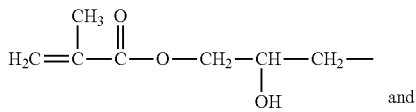

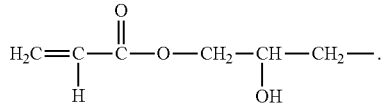

The tetravalent organic groups G and $G_1$ are not particularly limited, examples thereof including, but not limited to, tetravalent aromatic groups or tetravalent aliphatic groups. The aromatic groups can be monocyclic or polycyclic rings, and are preferably selected from a group consisting of

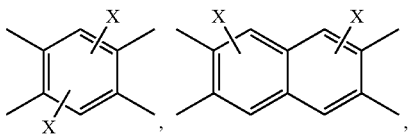

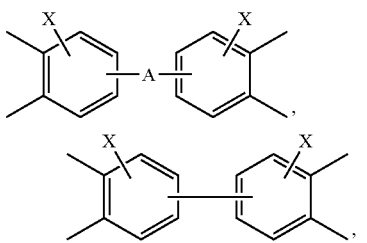

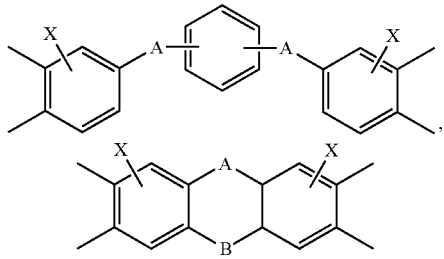

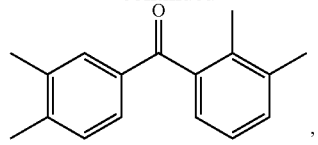

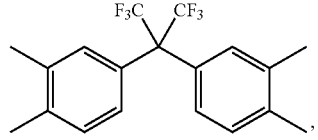

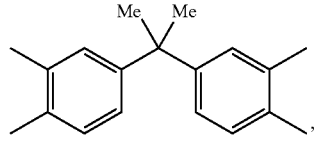

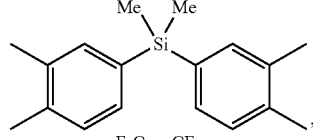

and a combination thereof, wherein X is each independently hydrogen, halogen, $C_1$-$C_4$ perfluoroalkyl or $C_1$-$C_4$ alkyl, and A and B are each independently a covalent bond, $C_1$-$C_4$ alkyl, $C_1$-$C_4$ perfluoroalkyl, alkoxy, silanyl, oxygen, sulfur, carbonyl, carboxylate, sulfonyl, phenyl, biphenyl, or

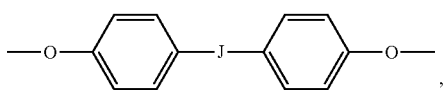

wherein J is —O—, —SO$_2$—, —CH$_2$—, C(CF$_3$)$_2$ or C(CH$_3$)$_2$.

More preferably, the tetravalent organic groups G and G$_1$ are each independently an aromatic group selected from a group consisting of

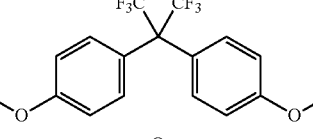

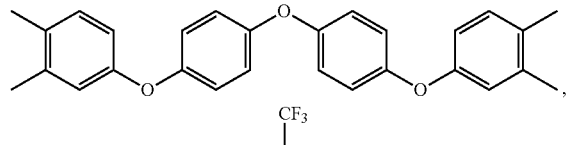

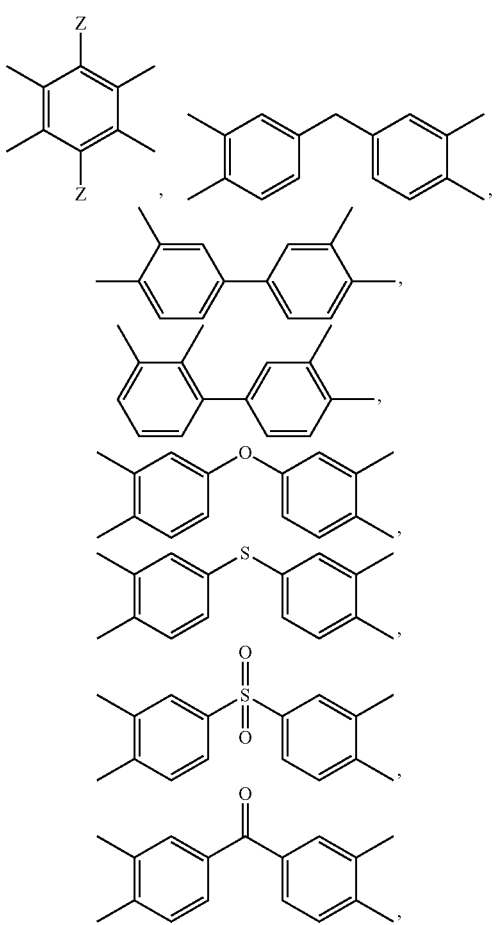

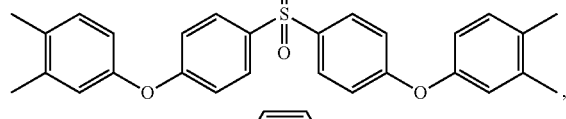

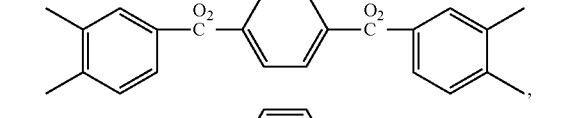

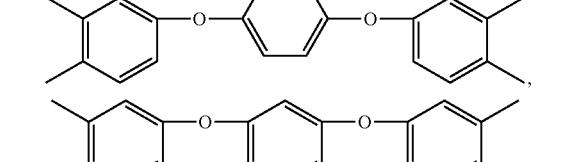

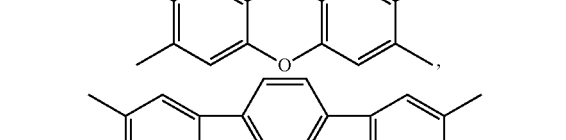

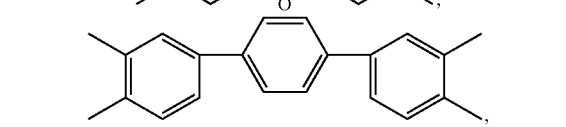

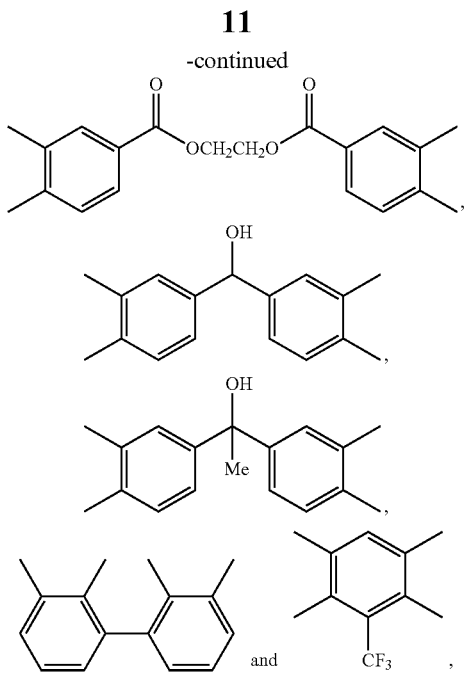

wherein Z is hydrogen or halogen.

Most preferably, the tetravalent organic groups G and $G_1$ are each independently

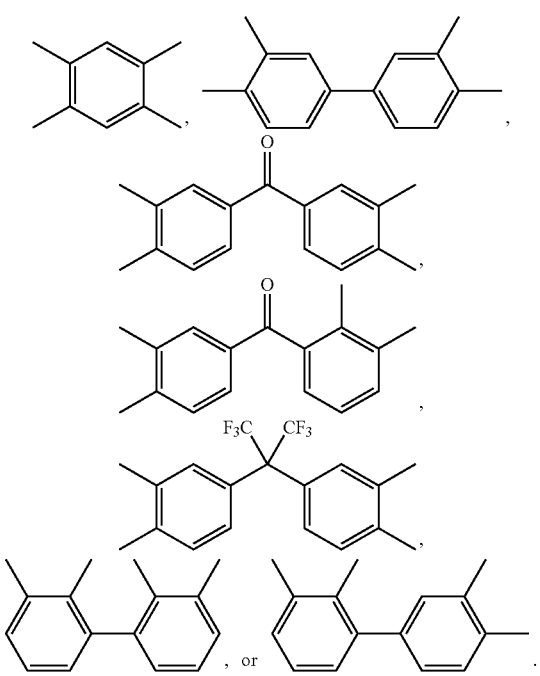

The tetravalent aliphatic groups can be selected from a group consisting of

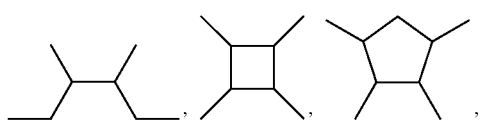

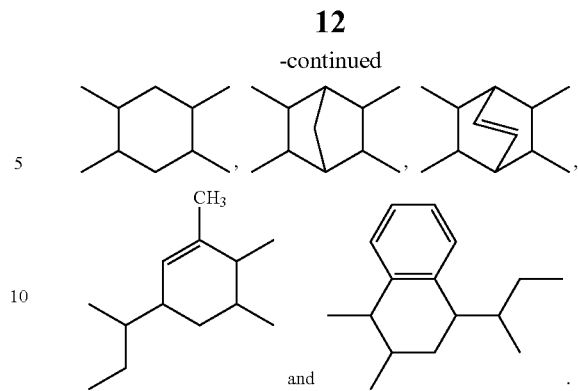

The divalent organic group P is not particularly limited, such as, but not limited to, an aromatic group. Preferably, the divalent organic group P is each independently selected from a group consisting of

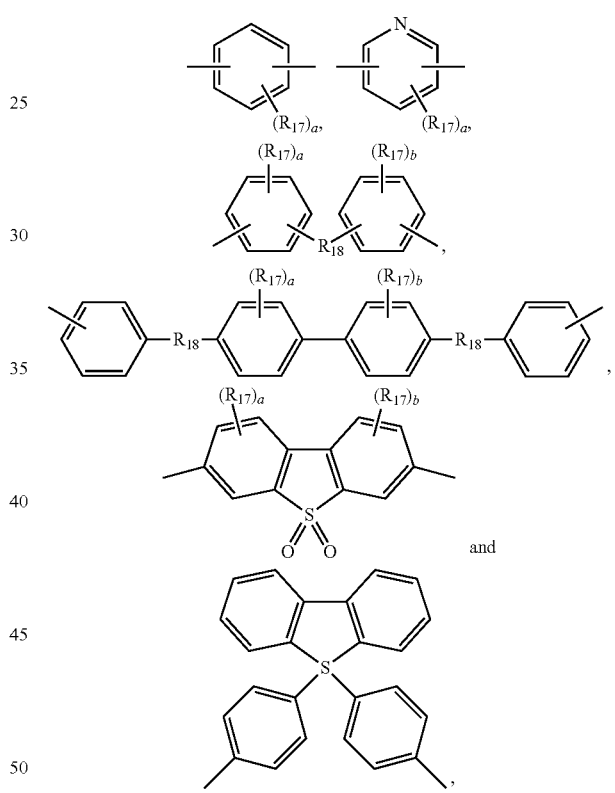

wherein, $R_{17}$ is each independently H, $C_1$-$C_4$ alkyl, $C_1$-$C_4$ perfluoroalkyl, methoxy, ethoxy, halogen, OH, COOH, $NH_2$ or SH;

each a is independently an integer of 0 to 4;

each b is independently an integer of 0 to 4; and $R_{18}$ is a covalent bond or a group selected from —O—, —S—, —$CH_2$—, —$S(O)_2$—,

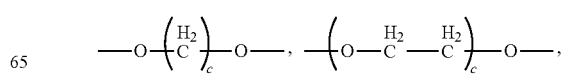

—C(CF$_3$)$_2$—, —C(O)—, —C(CH$_3$)$_2$—,
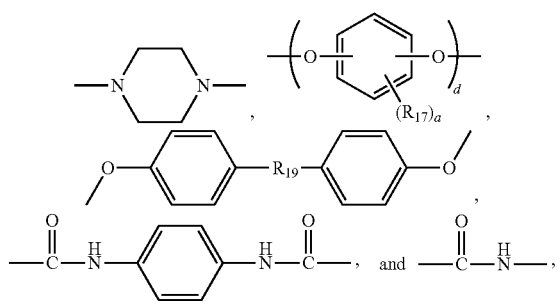
wherein,
c and d are each independently an integer from 0 to 20;
R$_{17}$ and a are as defined above; and
R$_{19}$ is —S(O)$_2$—, —C(O)—, a covalent bond or C$_1$-C$_{18}$ alkyl.
More preferably, each divalent organic group P is independently selected from a group consisting of
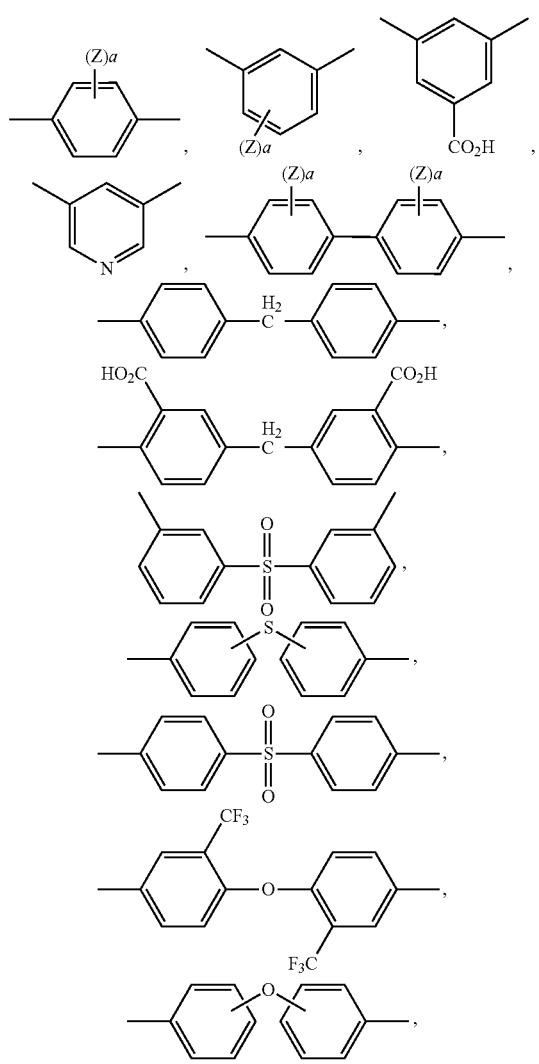
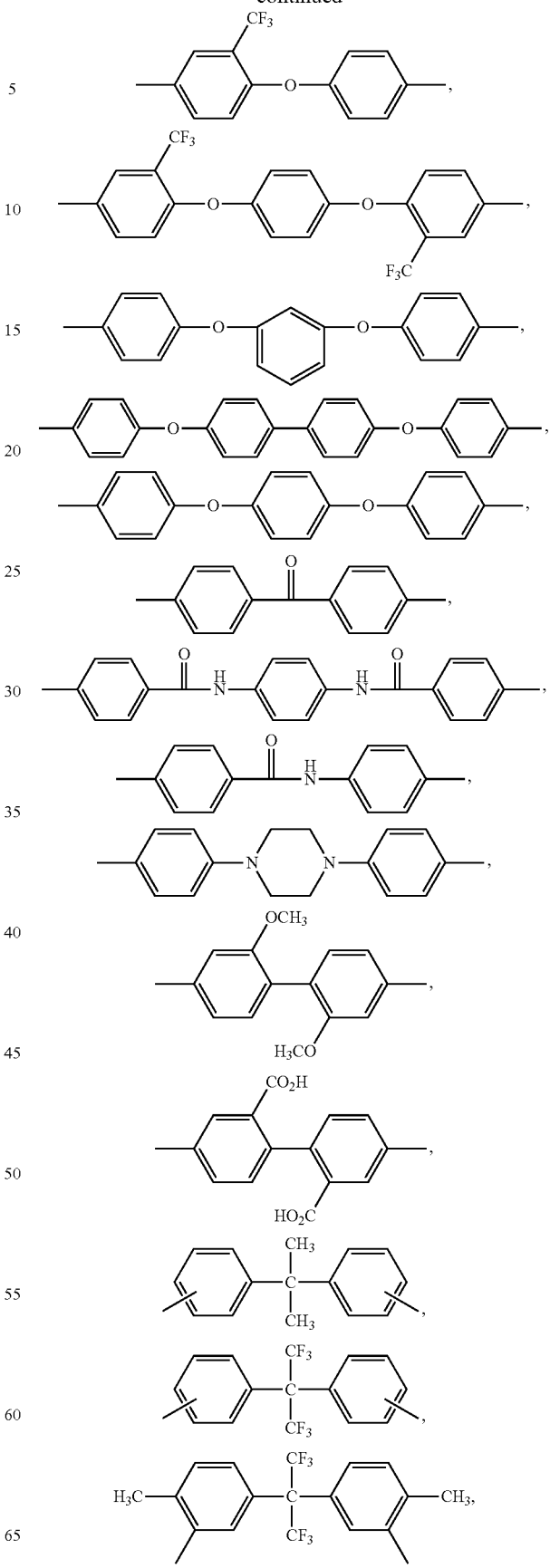

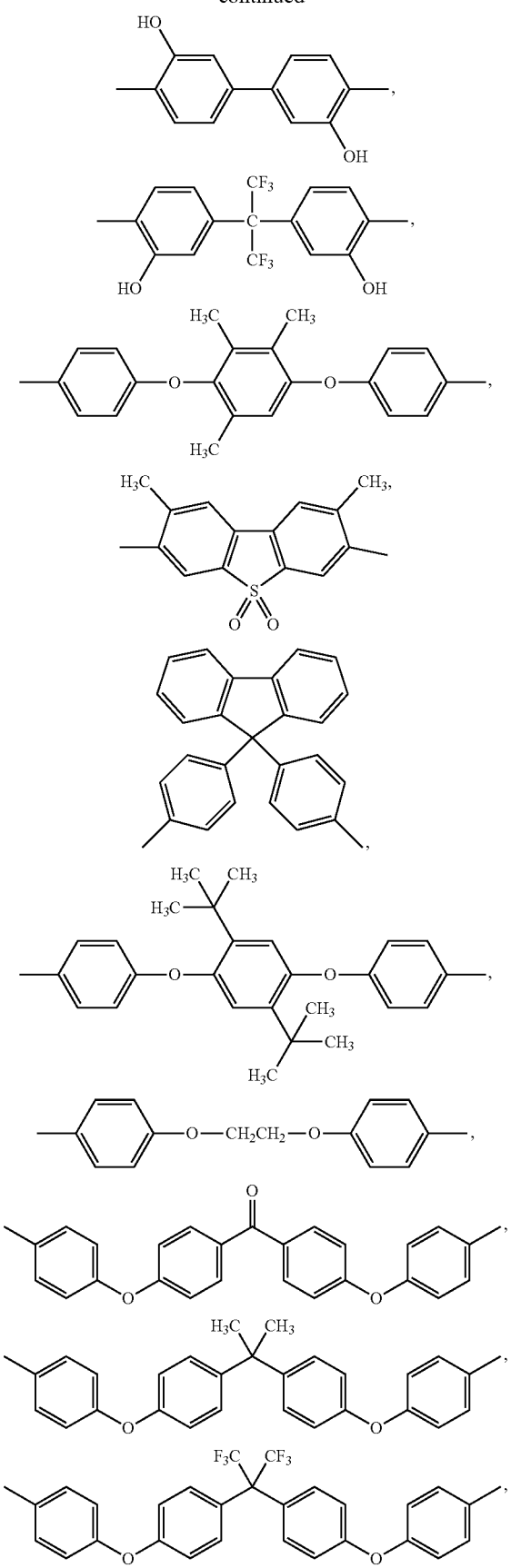
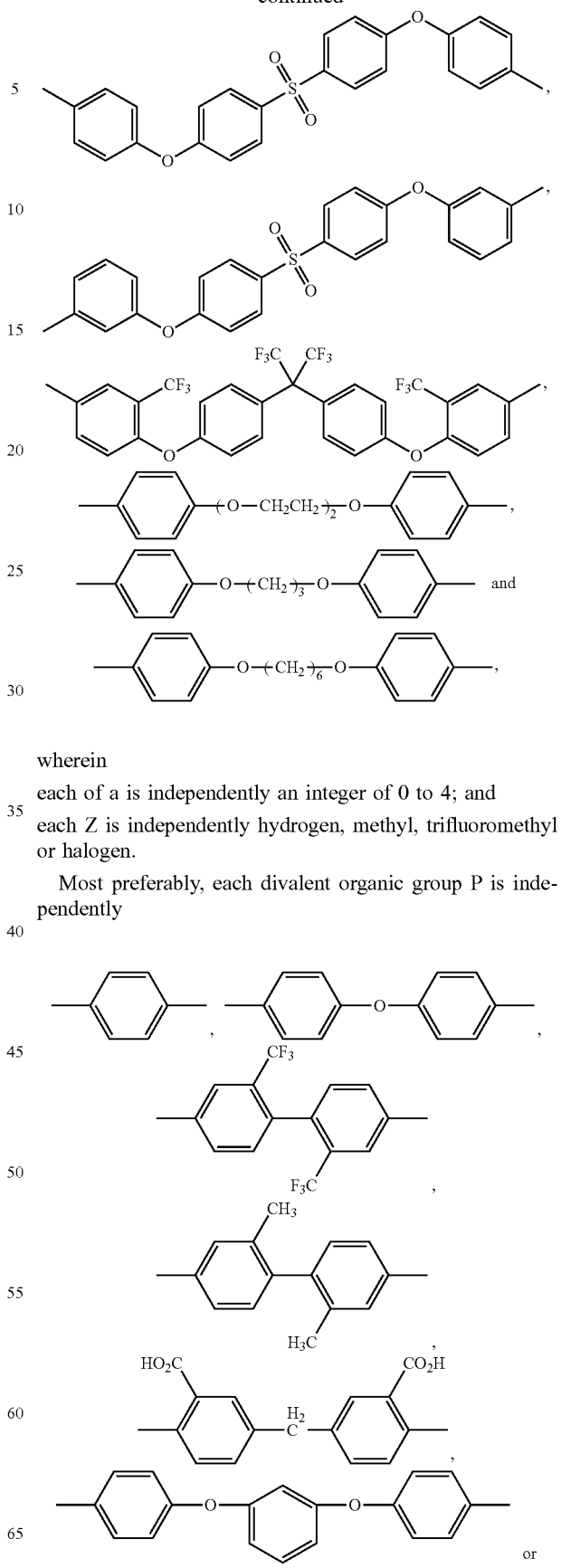
wherein
each of a is independently an integer of 0 to 4; and
each Z is independently hydrogen, methyl, trifluoromethyl or halogen.
Most preferably, each divalent organic group P is independently
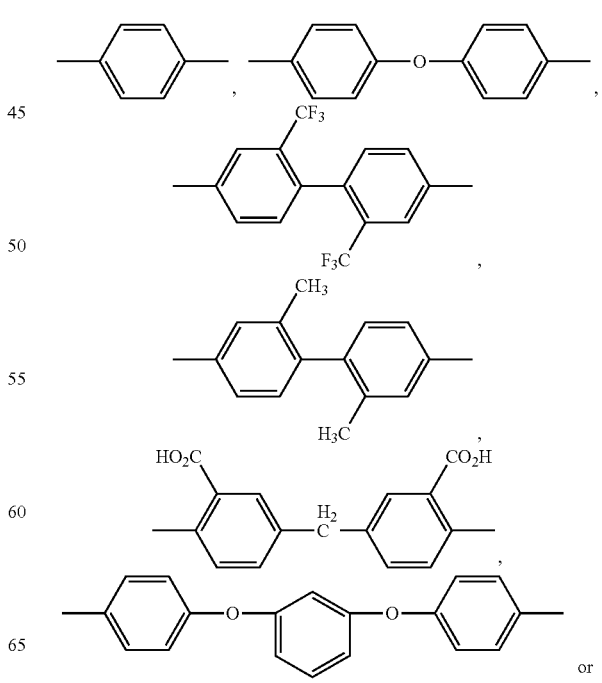
or -continued

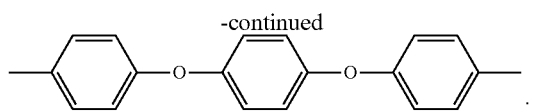

The divalent organic group P can also be a non-aromatic group, for example, but not limited to

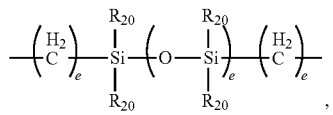

wherein each $R_{20}$ is independently H, methyl or ethyl; and e and f are each independently an integer greater than 0.

Preferably, the divalent organic group P is

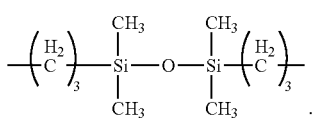

In the polyimide precursors of formulae (1) to (4), each R is independently $C_1$-$C_{14}$ alkyl, $C_6$-$C_{14}$ aryl, $C_6$-$C_{14}$ aralkyl, a phenolic group or an ethylenically unsaturated group. The $C_1$-$C_{14}$ alkyl may be, for example, but not limited to, the following groups:

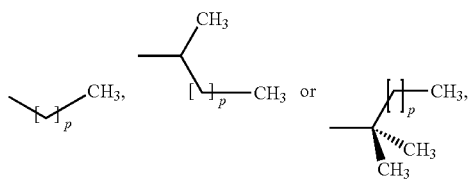

wherein p is an integer from 0 to 10. $C_1$-$C_{14}$ alkyl may be, for example, but not limited to, methyl, ethyl, n-propyl, isopropyl, 1-methylpropyl, 2-methylpropyl, n-butyl, isobutyl, tert-butyl, 1-methylbutyl, 2-methylbutyl, pentyl, hexyl, heptyl or octyl. The ethylenically unsaturated group is as defined above. The $C_6$-$C_{14}$ aryl or $C_6$-$C_{14}$ aralkyl mentioned above is preferably selected from a group consisting of

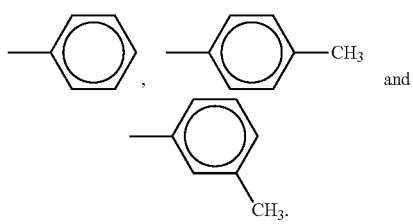

R is most preferably selected from a group consisting of

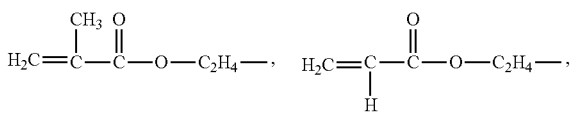

-continued

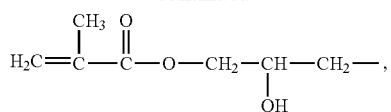

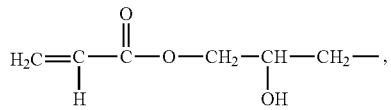

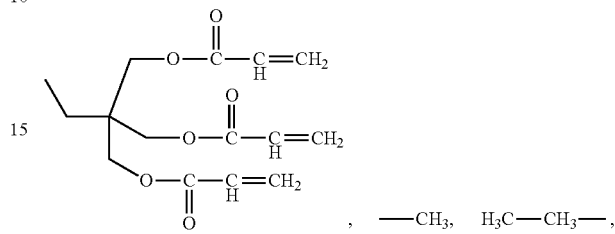

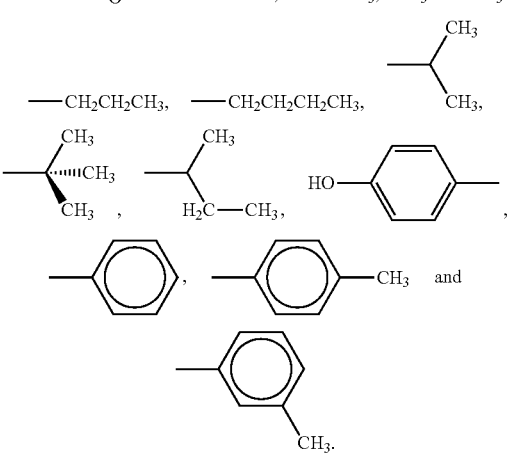

In the polyimide precursors of formulae (1) and (3), each $R_x$ is independently H or an ethylenically unsaturated group, wherein the ethylenically unsaturated group is as defined above. According to the present invention, preferably, each $R_x$ is independently H, 2-hydroxypropyl methacrylate, ethyl methacrylate, ethyl acrylate, propenyl, methylpropenyl, n-butenyl or isobutenyl; more preferably, each $R_x$ is independently H or 2-hydroxypropyl methacrylate of the formula shown below:

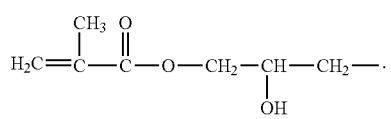

In the polyimide precursors of formula (4), each D is independently a nitrogen-containing heterocyclic group or an OR*-containing group, wherein R* is $C_1$-$C_{20}$ alkyl. According to the present invention, the term "the nitrogen-containing heterocyclic group"-refers to a non-aromatic 5 to 8-membered monocyclic ring having 1 to 3 heteroatoms, a 6 to 12-membered bicyclic ring having 1 to 6 heteroatoms, or a 11 to 14-membered tricyclic ring having 1 to 9 heteroatoms (in which the heteroatoms are nitrogen); examples thereof include, but are not limited to, pyridyl, imidazolyl, morpholinyl, piperidyl, piperazinyl, pyrrolidinyl, pyrrolidinonyl and the like. Preferably, each D is independently:

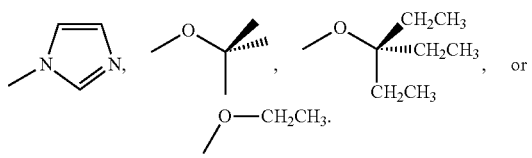

Soluble Polyimide

The soluble polyimide of the present invention is not particularly limited and can be any conventional soluble polyimide known to a person of ordinary skill in the art such as those disclosed in ROC (Taiwan) Patent Application No. 097101740, No. 099105794, No. 097138725 or No. 097138792, the contents of which are hereby incorporated for reference in their entity.

The soluble polyimide of the present invention mainly has a repeating unit of formula (B):

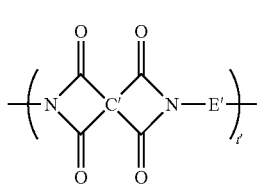

(B)

wherein C is a tetravalent organic group;
E' is a divalent organic group; and
t' is an integer greater than 0, preferably an integer from 1 to 1000.

The tetravalent organic group C has the same meaning as defined above for group G.

The divalent organic group E' has the same meaning as defined above for group P.

Optionally, the soluble polyimide may be modified with different substituents/groups. For example, a photosensitive polyimide can be prepared by using photosensitive groups. The properties of a soluble polyimide may be altered by adjusting the end groups bonded to the repeating unit of formula (B).

Modified soluble polyimide obtained by adjusting the end groups bonded to the repeating unit of formula (B) includes, but is not limited to,

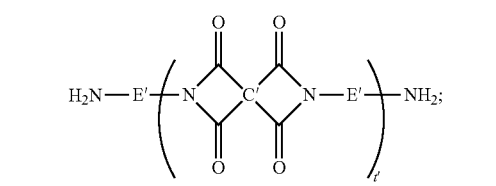

(1')

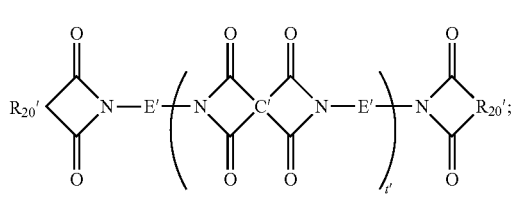

(2')

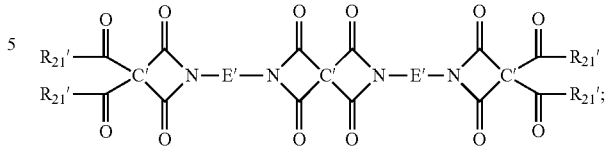

(3')

wherein, $R_{20}'$ is a saturated or unsaturated $C_2$-$C_{20}$ divalent organic group, preferably —C≡C—,

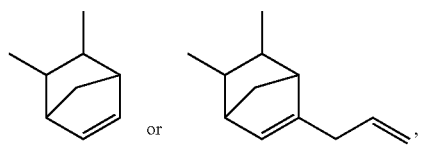

$R_{21}'$ is an unsaturated $C_2$-$C_{20}$ single valent organic group which may be substituted by a heteroatom or a —OH group; and C', E' and t' are as defined above.

Preferably, the soluble polyimide modified by photosensitive groups includes, but is not limited to, those having the following repeating units and disclosed in ROC (Taiwan) Patent Application No. 099105794:

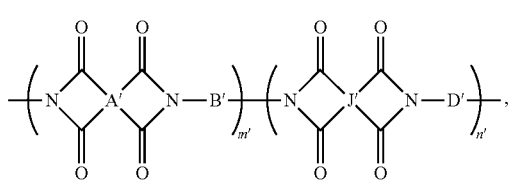

(4')

wherein, A' and J' are independently a tetravalent organic group; B' and D' are independently a divalent organic group; n' is 0 or an integer greater than 0; m' is an integer greater than 0; and at least one of A' and B' has one or more photosensitive group(s) G* selected from a group consisting of

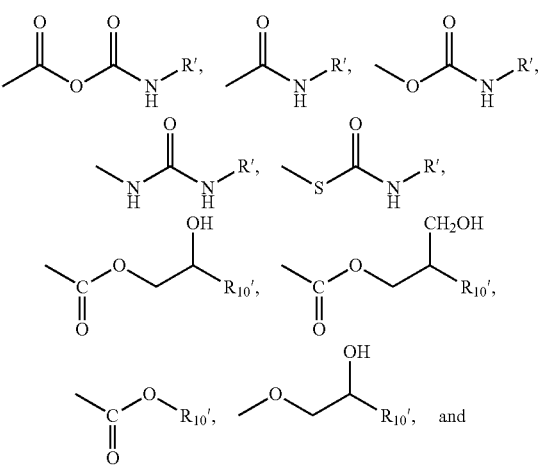

-continued

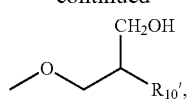

wherein, R' is an unsaturated group with —C≡C— or is selected from a group consisting of

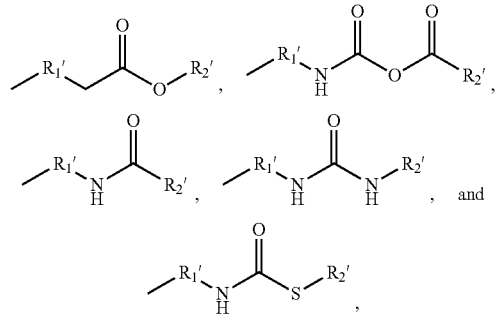

and $R_{10}'$ is an unsaturated group with an acrylate group; wherein, $R_1'$ is a substituted or unsubstituted, saturated or unsaturated $C_1$-$C_{20}$ organic group, and $R_2'$ is an unsaturated group with —C≡C—.

The aforementioned unsaturated group with —C≡C— is preferably selected from a group consisting of

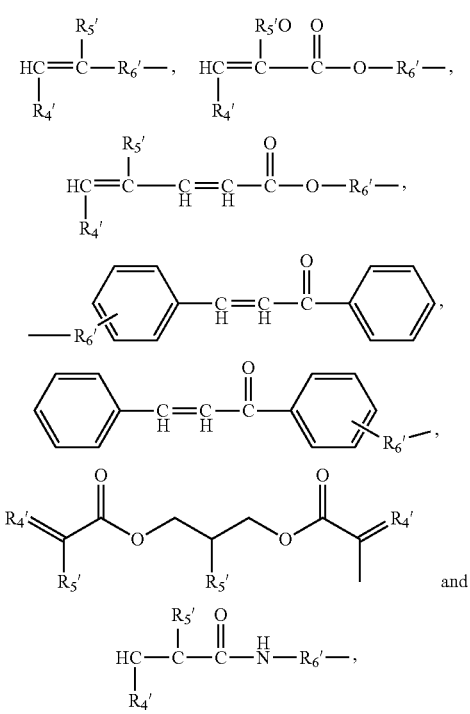

wherein, $R_4'$ and $R_5'$ are each independently H, or a substituted or unsubstituted $C_1$-$C_7$ organic group; and $R_6'$ is a covalent bond, —O—, or a substituted or unsubstituted $C_1$-$C_{20}$ organic group.

More preferably, the aforementioned unsaturated group with —C≡C— is selected from a group consisting of

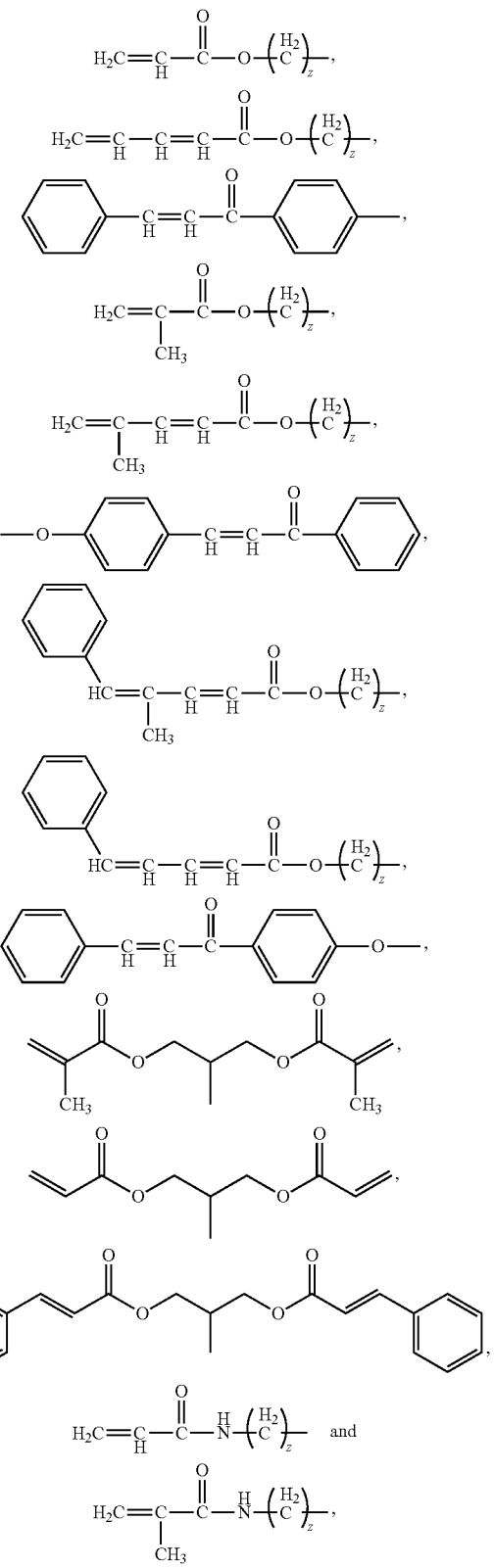

wherein z is an integer ranging from 0 to 6.

Most preferably, the aforementioned unsaturated group with —C≡C— is selected from a group consisting of

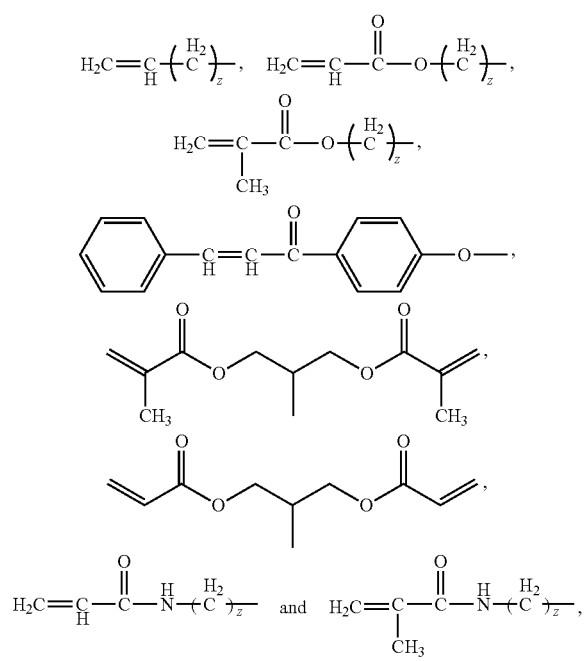

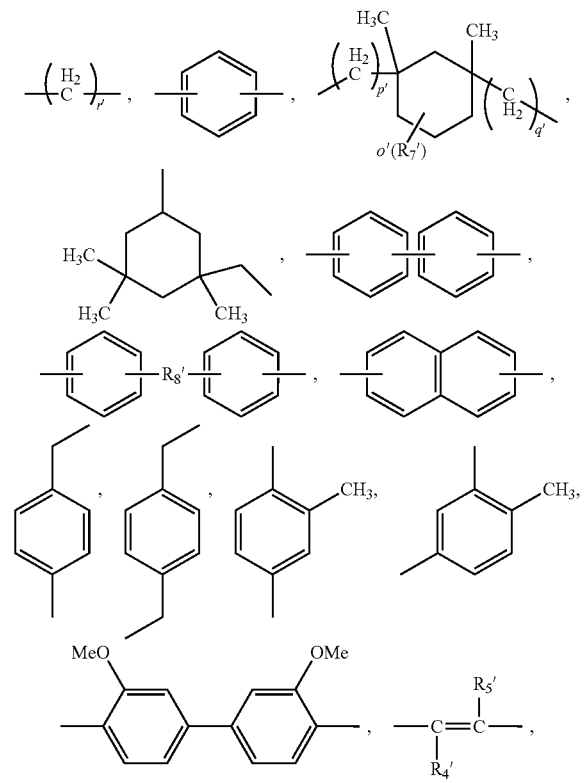

wherein z is an integer ranging from 0 to 6.

$R_1'$ is a substituted or unsubstituted, saturated or unsaturated $C_1$-$C_{20}$ organic group, which may be selected, for example, from a group consisting of

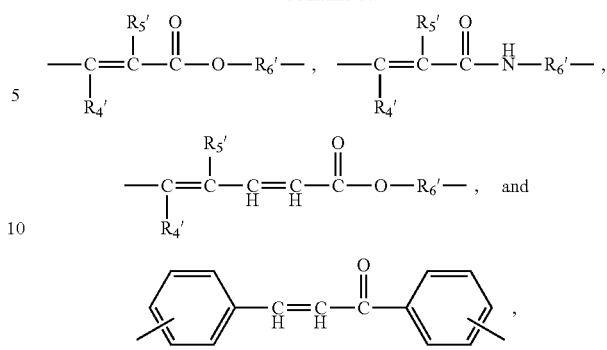

wherein, r' is an integer greater than 0, and preferably an integer ranging from 1 to 20; o', p' and q' are each independently 0 or an integer greater than 0, and preferably an integer ranging from 0 to 10; $R_4'$, $R_5'$ and $R_6'$ have the meanings as defined above; $R_7'$ is H or a substituted or unsubstituted $C_1$-$C_{12}$ organic group; and $R_8'$ is a covalent bond or selected from a group consisting of

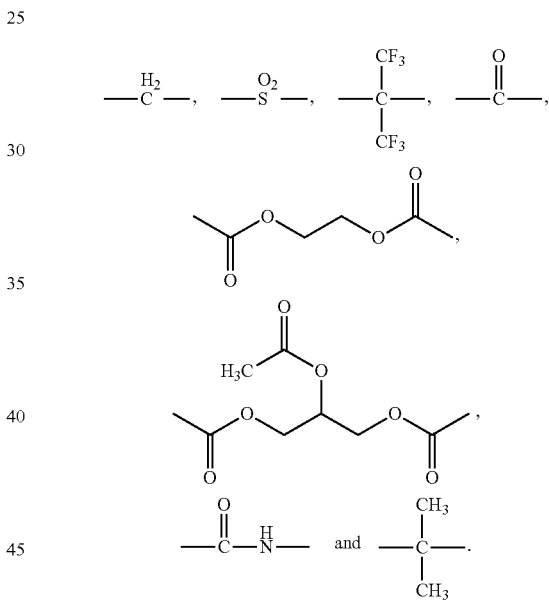

Preferably, $R_1'$ is selected from a group consisting of

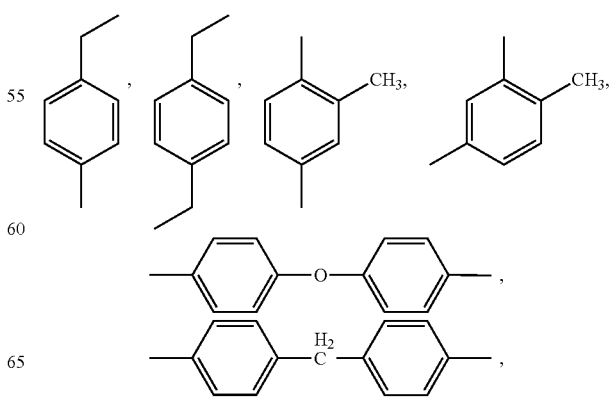

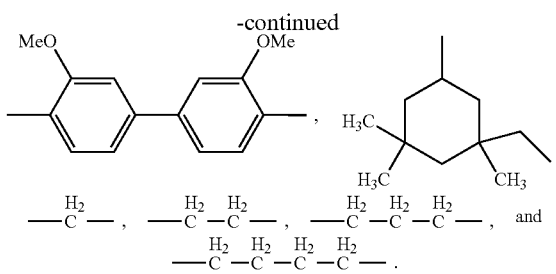

$R_{10}'$ is an unsaturated group with an acrylate group. In the present invention, the unsaturated group with an acrylate group is preferably

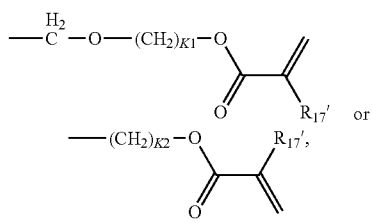

wherein $R_{17}'$ is H or methyl, and K1 and K2 are independently an integer ranging from 0 to 6, and preferably ranging from 2 to 4.

According to formula (4'), the compound of formula (4') has two polymerization units when n' is not zero. Said two polymerization units can be arranged randomly. That is, the polymerization units in formula (4') may have arrangements besides a regular arrangement of m' successive units with a photosensitive group followed by n' successive units with a non-photosensitive group.

(b) Solvent

The solvent having a gas-dissolving effect used in present invention can be a first solvent, a second solvent or a combination thereof.

The first solvent may also provide other effects in addition to the gas-dissolving effect. For example, the first solvent may be used as a solvent required during a process of resin synthesis or formulation (for example, a solvent required for synthesizing a polyimide precursor or a solvent required for a soluble polyimide). The first solvent is preferably a polar aprotic solvent, and for instance, may be selected from dimethyl sulfoxide (DMSO), diethyl sulfoxide, N,N-dimethyl-methanamide (DMF), N,N-diethyl-methanamide, N,N-dimethylacetamide (DMAc). N,N-diethylacetamide, N-methyl-2-pyrrolidone (NMP). N-ethyl-2-pyrrolidone (NEP), phenol, o-cresol, m-cresol, p-cresol, xylenol, halogenated phenol, pyrocatechol, tetrahydrofuran (THF), dioxane, dioxolane, propylene glycol monomethyl ether (PGME), tetraethylene glycol dimethyl ether (TGDE), methanol, ethanol, butanol, 2-butoxyethanol, γ-butyrolactone (GBL), xylene, toluene, hexamethylphosphoramide, propylene glycol monomethyl ether acetate (PGMEA) and a mixture thereof.

In addition to the gas-dissolving effect, the second solvent may be also useful for adjusting solvent polarity. As compared to the first solvent, the second solvent is a bubble-dissolving solvent having a better gas-dissolving effect. The second solvent is preferably selected from

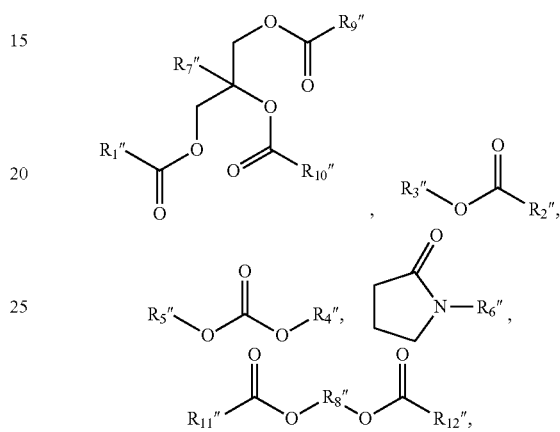

perfluoro aromatic compounds, $C_2$-$C_{20}$ perfluoroalkanes, tri-($C_1$-$C_6$ perfluoroalkyl)amines, perfluoroethers, $C_6$-$C_{16}$ alkanes and a combination thereof, wherein $R_1''$, $R_9''$ and $R_{10}''$ are independently H, $C_1$-$C_{20}$ alkyl, $C_2$-$C_{20}$ alkenyl, or $C_2$-$C_{20}$ alkynyl;

$R_7''$ is H or $C_1$-$C_3$ alkyl;

$R_2''$ is $C_1$-$C_{10}$ alkyl or $C_{10}$-$C_{30}$ alkenyl;

$R_3''$ is $C_2$-$C_{20}$ alkyl, —$C_1$-$C_{10}$ alkyl-O—$C_1$-$C_{10}$ alkyl or $C_{10}$-$C_{30}$ alkenyl;

$R_4''$ and $R_5''$ are independently $C_1$-$C_{10}$ alkyl, or $R_4''$ and $R_5''$, together with the oxygen atoms they attached to, form a 5-6 membered heterocyclic;

$R_6''$ is $C_1$-$C_{51}$ alkyl or $C_4$-$C_8$ cycloalkyl;

$R_5''$ is $C_2$-$C_{10}$ alkylene; and $R_{11}''$ and $R_{12}''$ are independently $C_1$-$C_{10}$ alkyl.

Through extensive studies and repeated experiments, the inventors of the present invention have found that the solvents containing fluorine, an alkyl group or an ester group have better gas-dissolving efficiency and are the preferred second solvents. The species of the second solvent are exemplified below.

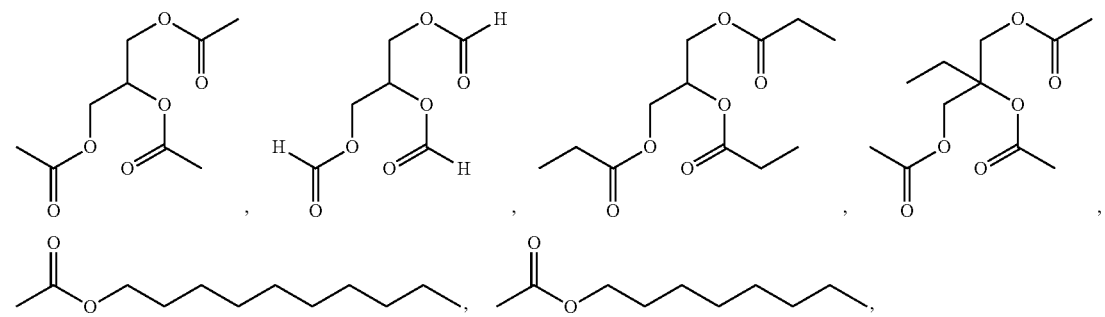

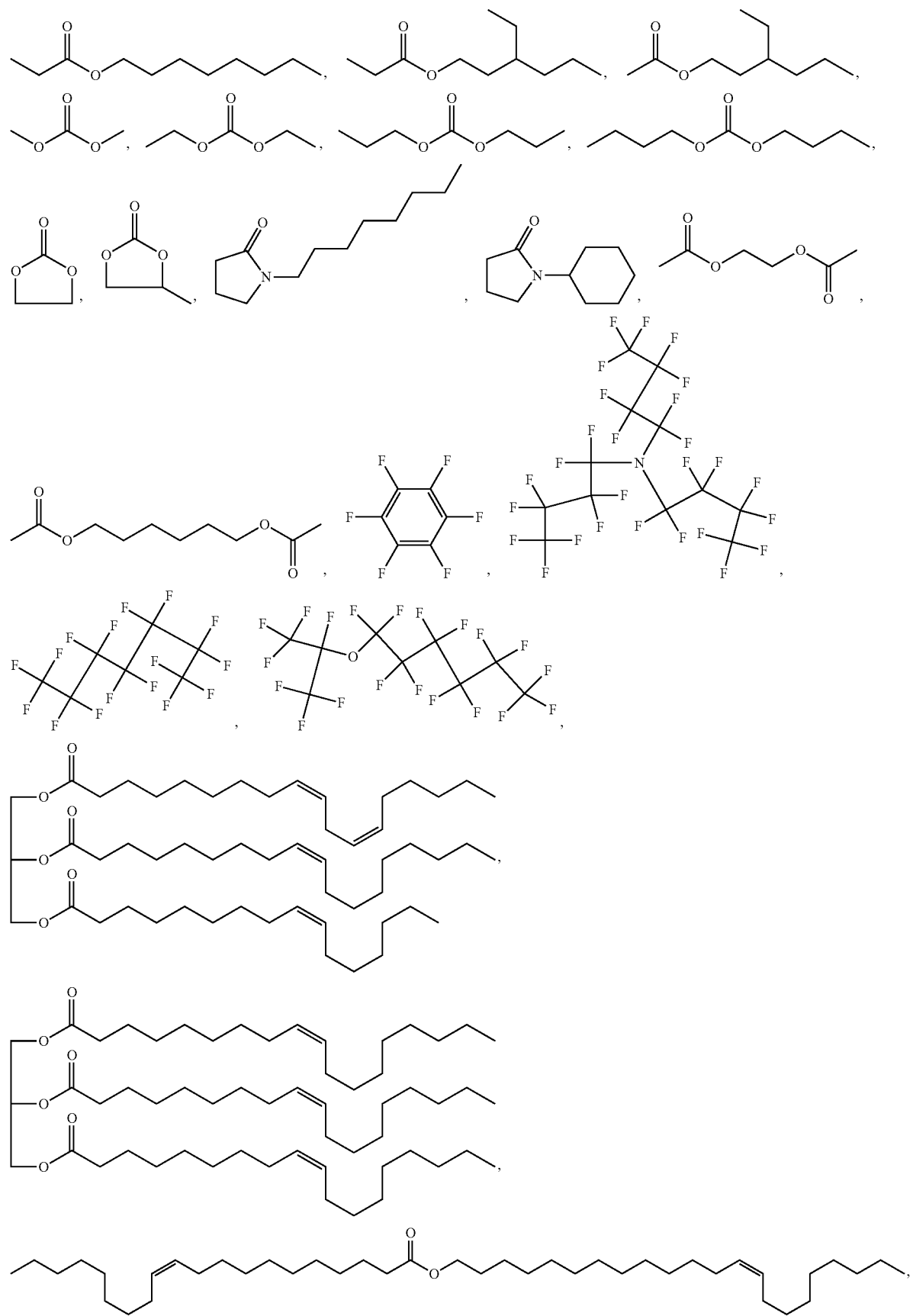

-continued

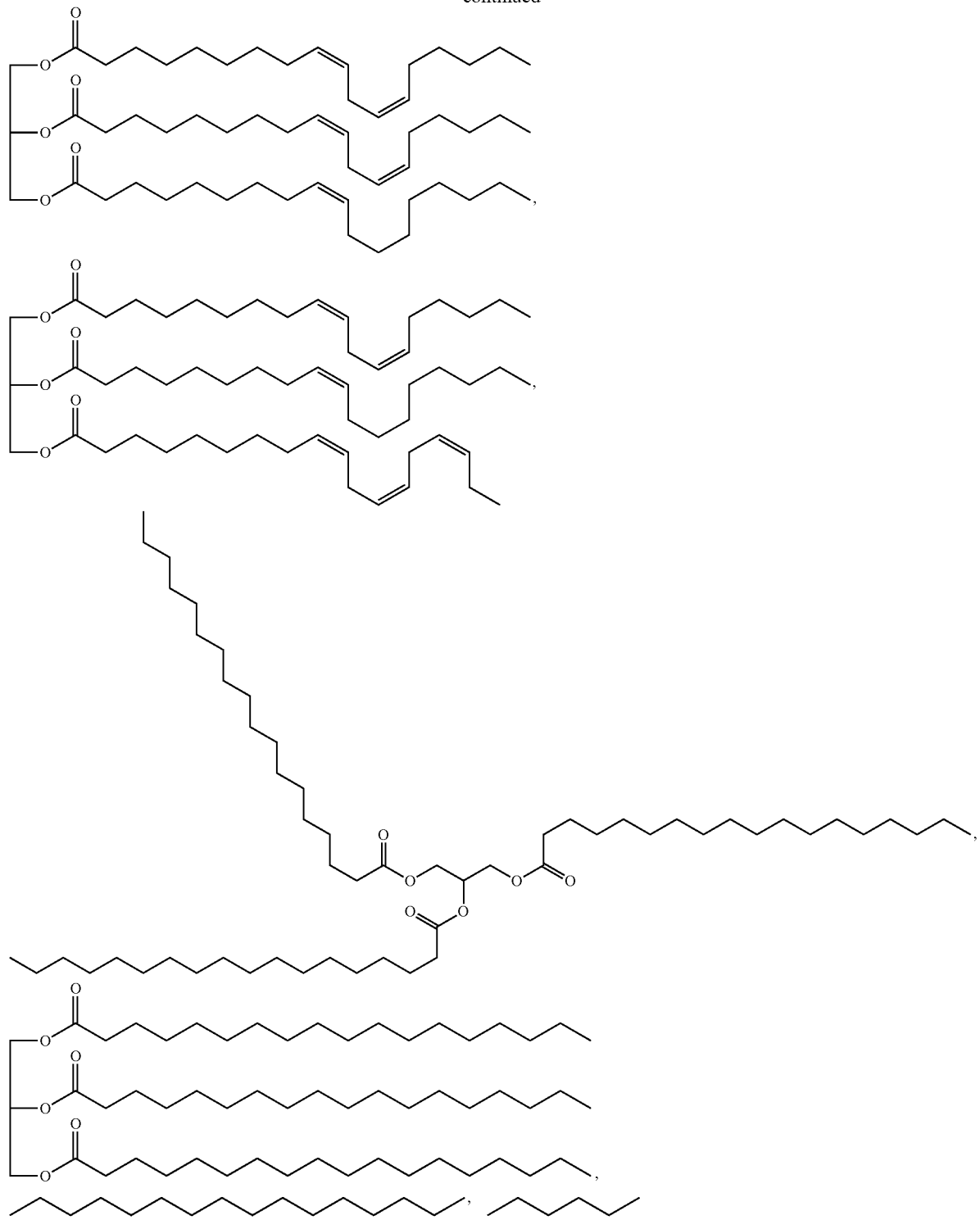

and a combination thereof.

The first solvent is present in an amount of 0.5 wt % to 50 wt %, preferably between 1 wt % to 28 wt %, more preferably between 1.5 wt % to 25 wt %, based on the total weight of the resin layer. When the second solvent exists, the second solvent is present in an amount of 3 wt % to 45 wt %, preferably between 5 wt % to 43 wt %, more preferably between 7 wt % to 40 wt %, based on the total weight of the resin layer.

According to one embodiment of the present invention, the solvent-containing dry film comprises a carrier and a resin layer; when the carrier is polyethylene terephthalate and the resin layer is a polyimide layer, the total amount of the solvent of the present invention is between 15 wt % and 60 wt %, preferably between 20 wt % and 50 wt %, and more preferably between 25 wt % and 47 wt %, based on the total weight of the resin layer. The solvent used in the present invention comprises a first solvent and an optional second solvent; the first solvent has a gas-dissolving effect and is a solvent used for the synthesis of a polyimide precursor or a soluble polyimide, and the species of the first solvent are as defined above. The amount of the first solvent is between 0.5 wt % and 50 wt %, preferably between 1 wt % and 28 wt %, and more preferably between 1.5 wt % and 25 wt %, based on the total weight of the resin layer. In addition, if the second solvent having a better gas-dissolving effect is added, better gas-dissolving effect can be achieved such that undesired gas between a substrate and the polyimide layer is rapidly dissolved into the polyimide layer and no phenomenon of re-bubbling occurs for a long time after dissolution, without the use of a vacuum lamination apparatus. The species of the second solvent are as defined above. If present, the amount of the second solvent is between 3 wt % and 45 wt %, preferably between 5 wt % and 43 wt %, and more preferably between 7 wt % and 40 wt %, based on the total weight of the resin layer. When the amount of the second solvent is too low (for example, lower than 3 wt %), the dry film has a worse bubble-dissolving effect during the lamination process so that it cannot achieve a significant and rapid bubble-dissolving effect and a phenomenon of re-bubbling may easily occur. However, when the amount of the second solvent is too high (for example, higher than 45 wt %), the dry film is excessively hydrophobic so glue flow occurs; the compatibility of the polyimide layer with another component is poor so the polyimide layer has poor adhesion to the substrate and the operability is worse. Furthermore, the awareness of environment protection has grown in recent years and the industry focuses on processes that can be carried out at a lower temperature so as to reduce energy-consuming. In the case that low temperature processing is applied, the second solvent can be present in an amount between 7 wt % and 15 wt % and the dry film of the present invention still achieves good bubble-dissolving effect.

The second solvent is preferably a bubble-dissolving solvent containing fluorine, an alkyl group or an ester group, bubble-dissolving solvents containing an ester group has better gas-dissolving effect, which can be, for example:

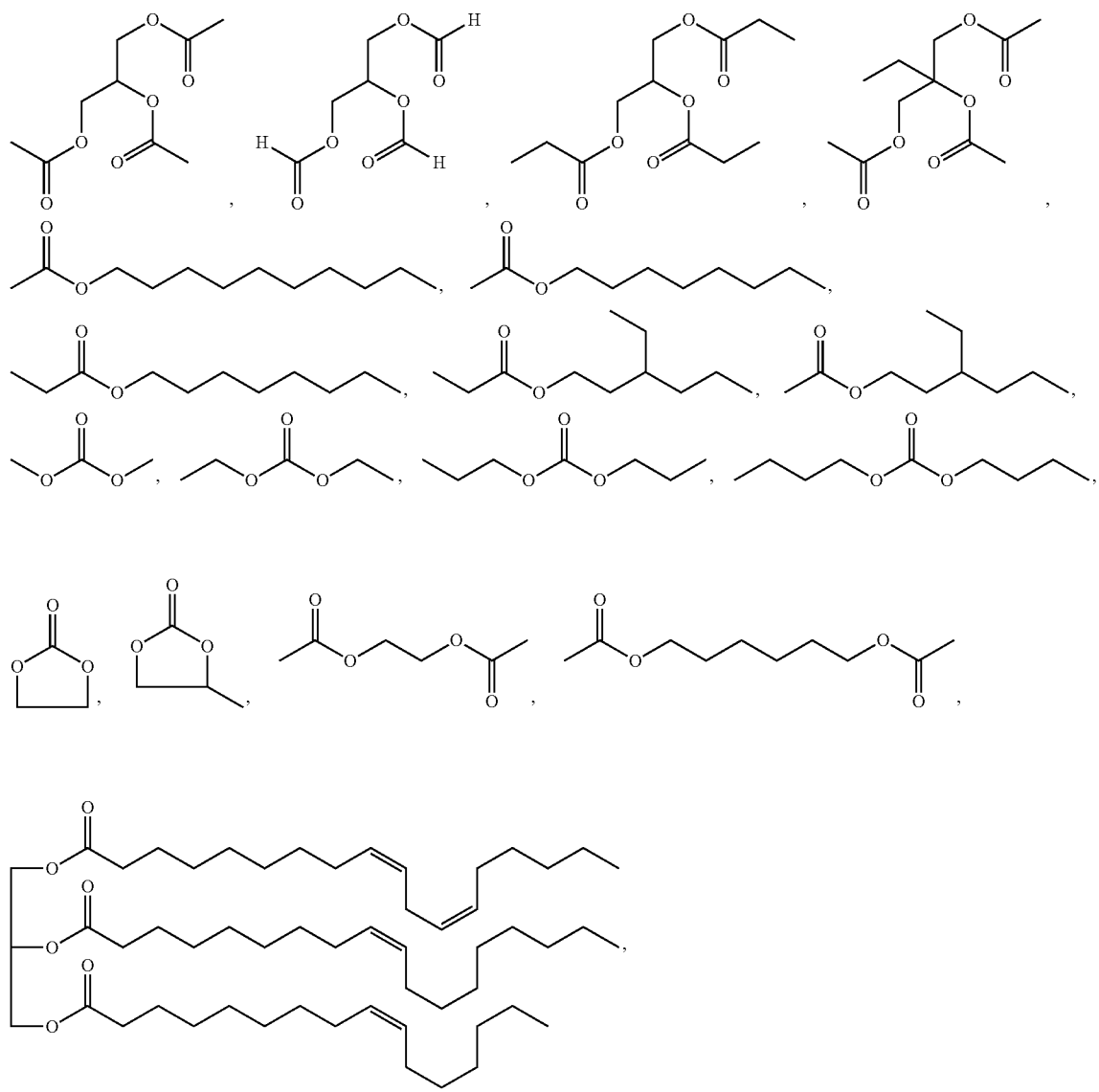

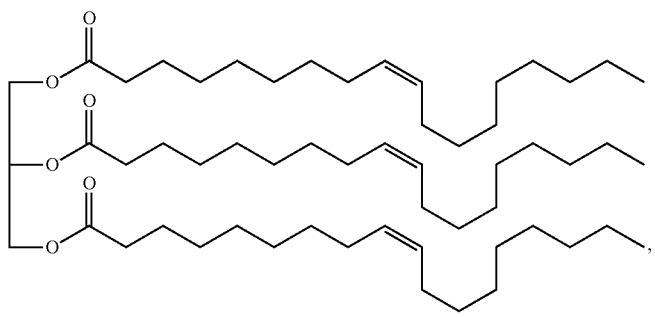
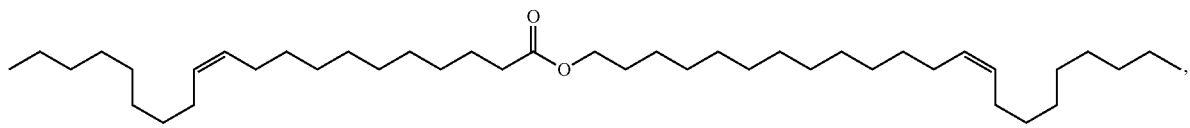
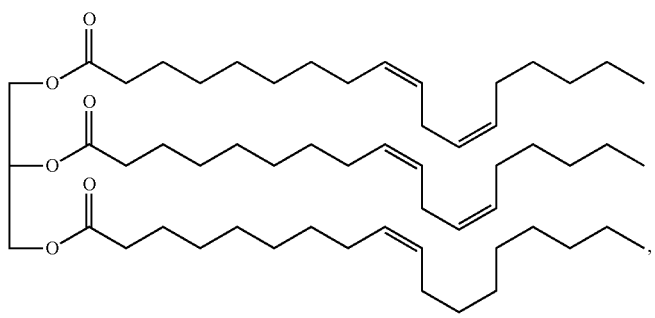
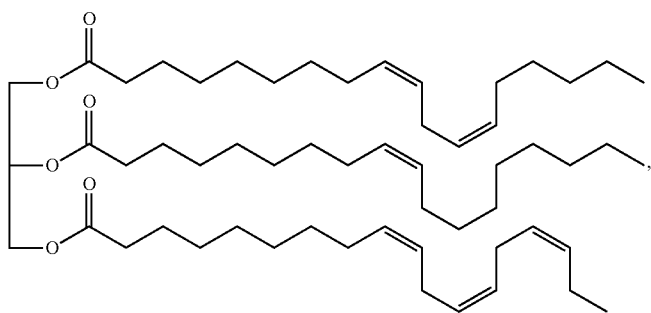
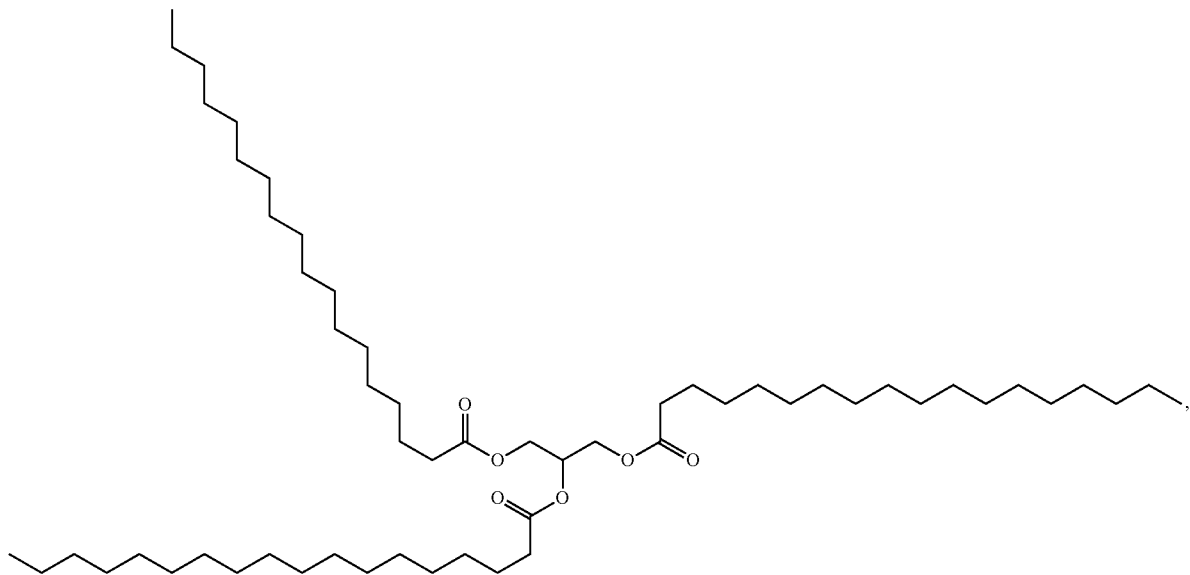

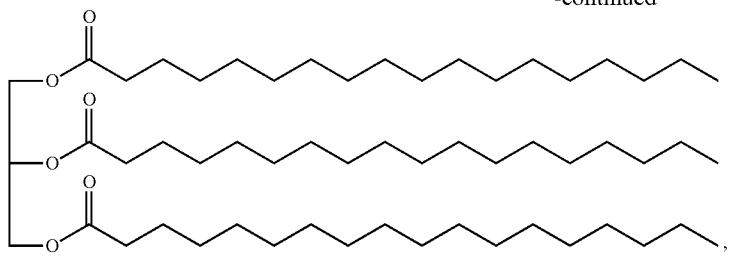

and a combination thereof.

Method for Forming a Dry Film

For example, the dry film of the present invention may be prepared according to the following steps (a polyimide resin is taken as an example):

(1) preparing a polyimide resin composition which comprises a polyimide resin and a first solvent;

(2) optionally, adding a second solvent or an additive to the polyimide resin composition;

(3) applying the polyimide resin composition prepared from step (2) on a carrier, to form a dry film semi-product which comprises the carrier and a resin layer, (4) putting the dry film semi-product to an oven to heat and dry it so as to remove a portion of the solvent, thereby reducing the total amount of the solvent in the resin layer; ensuring the existence of an appropriate amount of the solvent (for example, at least 5 wt % based on the total weight of the resin layer) in the dry film semi-product by controlling the heating time and temperature, and forming a solvent-containing dry film, wherein the solvent is present in a total amount of at least 5 wt % based on the total weight of the resin layer; and (5) optionally, applying a protection film on the resin layer.

In the polyimide resin composition stated in the above step (1), the amount of the first solvent is not particularly limited and can be adjusted by a person of ordinary skill in the art when needed. Based on the total weight of the composition, the amount of the first solvent added is 20 wt % to 90 wt %, preferably 45 wt % to 80 wt %. Species of the first solvent are as defined above.

Species of the second solvent in the above step (2) are as defined above.

In the above step (2), any suitable additive that is known to a person of ordinary skill in the art may be optionally added to the resin composition. For example, when the resin layer is a photosensitive polyimide layer, the additive comprises a photoinitiator and an acrylate monomer. Species of the above-mentioned photosensitive polyimide resin are as defined herein previously.

The photoinitiator is used to generate a free radical under light irradiation and to initiate a polymerization due to the transfer of the free radical. There is no special limitation to the photoinitiator useful in the composition of the photosensitive polyimide resin of the present invention. Preferably, the photoinitiator comprises a compound capable of generating a free radical through absorbing the light with a wavelength of about 350 nm to about 500 nm.

The amount of the photoinitiator is about 0.01 parts by weight to about 20 parts by weight, and preferably about 0.05 parts by weight to about 5 parts by weight based on 100 parts by weight of the photosensitive polyimide. The photoinitiator suitable for use in the present invention may be, for example, selected from a group consisting of benzophenone 2,4,6-trimethylbenzoyl diphenyl phosphine oxide, bis-4,4'-diethylaminobenzophenone, benzophenone, camphorquinone, 3,5-bis(diethylaminobenzylidene)-N-methyl-4-piperidone, 3,5-bis(dimethylaminobenzylidene)-N-methyl-4-piperidone, 3,5-bis(diethylaminobenzylidene)-N-ethyl-4-piperidone, 3,3'-carbonyl-bis(7-diethylamino) cumarin, 3,3'-carbonyl-bis(7-dimethylamino)cumarin, riboflavin tetrabutyrate, 2-methyl-1-[4-(methylthio)phenyl]-2-morpholinopropan-1-one, 2,4-dimethylthioxanthone, 2,4-diethylthioxanthone, 2,4-diisopropylthioxanthone, 3,5-dimethylthioxanthone, 3,5-diisopropylthioxanthone, 1-phenyl-2-(ethoxycarbonyl)oxyiminopropan-1-one, benzoin ether, bezoin isopropyl ether, benzanthrone, 5-nitroacenaphthene, 2-nitrofluorene, anthrone, 1,2-benzanthraquinone, 1-phenyl-5-mercapto-1H-tetrazole, thioxanthen-9-one, 10-thioxanthenon, 3-acetylindole, 2,6-di(p-dimethylaminobenzal)-4-carboxycyclohexanone, 2,6-di (p-dimethylaminobenzal)-4-hydroxycyclohexanone, 2,6-di(p-diethylaminobenzal)-4-carboxycyclohexanone, 2,6-di(p-diethylaminobenzal))-4-hydroxycyclohexanone, 4,6-dimethyl-7-ethylaminocumarin, 7-diethylamino-4-methylcumarin, 7-diethylamino-3-(1-methylbenzoimidazolyl) cumarin, 3-(2-benzoimidazolyl)-7-diethylaminocumarin, 3-(2-benzothiazolyl)-7-diethylaminocumarin, 2-(p-dimethylaminostyryl)benzooxazole, 2-(p-dimethylaminostyryl)quinoline, 4-(p-dimethylaminostyryl)quinoline, 2-(p-dimethylaminostyryl) benzothiazole, 2-(p-dimethylaminostyryl)-3,3-dimethyl-3H-indole and a combination thereof. The preferred photoinitiator is benzophenone, 2,4,6-trimethylbenzoyl diphenyl phosphine oxide, or a combination thereof.

The aforementioned acrylate monomer is an acrylate monomer containing at least one —C≡C— bond, preferably a multi-functional acrylate monomer containing two or more —C≡C— bonds. The addition of such monomer may form cross-linking between molecules and improve practicability of the composition. Preferably, an acrylate monomer selected from the following groups can be used in the present invention: ethylene glycol dimethacrylate, ethylene glycol diacrylate, bisphenol A ethylene glycol-modified diacrylate, bisphenol A ethylene glycol-modified dimethacrylate, bisphenol F ethylene glycol-modified diacrylate, bisphenol F ethylene glycol-modified dimethacrylate, propylene glycol dimethacrylate, tripropylene glycol diacrylate, ethoxylated trimethylolpropane triacrylate, dipentaerythritol hexaacrylate, trimethylolpropane triacrylate, trimethylolpropane trimethylacrylate, pentaerythritol triacrylate, pentaerythritol trimethylacrylate and a combination thereof. When an acrylate monomer exists, based on 100 parts by weight of a photosensitive polyimide precursor, the amount of the acrylate monomer added is about 5 to 80 parts by weight, preferably 10 to 40 parts by weight.

Species of the carrier in the above step (3) are as defined above.

There is no special limitation to the heating temperature and time in the above step (4). The heat treatment in step (4)

mainly aims to reduce the amount of the solvent in the resin layer. For example, the heating may be carried out for drying at an appropriate temperature between 80° C. and 250° C. over 30 sec to 10 min. During a conventional process of dry film preparation, in order to prevent the dry film from generating a volatile organic compound with high concentration during usage of the dry film and to reduce the phenomenon of excessive glue (bleeding) caused by the flowing of the coated glue during storage of the dry film, the heating is often conducted such that the solvent is almost volatilized completely (to an amount less than 1 wt %) in a step of solvent removal corresponding to the above step (4). However, in contrast with the conventional step, in the present invention, the solvent is not completely removed in the step of solvent removal but remained in an appropriate amount (for example, at least 5 wt % based on the total weight of the resin layer) that can give play to a gas-dissolving effect, thus achieving a beneficial bubble-dissolving effect.

The solvent in the above step (4) is selected from a first solvent, a second solvent and a mixture thereof. Generally, due to the difference of boiling points of different solvents, the total amount of the solvent in the dry film can be controlled by properly adjusting the heating temperature and time. As described above, in order to achieve the effect that, without a vacuum lamination apparatus, undesired gas between a substrate and the polyimide layer is rapidly dissolved into the polyimide layer and no phenomenon of re-bubbling occurs for a long time after dissolution, the total amount of the solvent in the dry film obtained in step (4) is preferably between 15 wt % and 60 wt % based on the total weight of the polyimide resin layer, and the amount of the second solvent is preferably between 3 wt % and 45 wt % based on the total weight of the polyimide resin layer.

The protection film in step (5) includes, for example, but is not limited to polyester resin, polyethylene terephthalate (PET) or polyethylene naphthalate(PEN); polymethacrylate resin such as polymethyl methacrylate (PMMA); polyimide resin; polystyrene resin; polycycloolefin resin; polyolefin resin; polycarbonate resin; polyurethane resin; triacetate cellulose (TAC) or a combination thereof. Preferably, the protection film is polyethylene terephthalate, polymethyl methacrylate, polycycloolefin resin, triacetate cellulose or a combination thereof. More preferably, the protection film is polyethylene terephthalate.

In the prior art, the dry film is applied as a coverlay or passivation layer to a printed circuit board or wafer. Due to a too high cost of investment in the vacuum lamination apparatus, a long process cycle and a low production rate, a bottleneck is formed in commercial production. The solvent-containing dry film of the present invention may, without the vacuum lamination apparatus, utilize characteristics of the solvent having a gas-dissolving effect to easily dissolve undesired gas. Therefore, the dry film of the present invention can be applied to the field, such as printed circuit board, wafer, display or touch panel, by using a simpler and more cost-effective process than that used in the prior art.

Method for Applying a Dry Film on a Substrate

The present invention further provides a method for applying a dry film on a substrate, comprising:

(a) after removing an optional protection film, laminating the dry film to the substrate in a manner that a resin layer of the dry film faces the substrate; and (b) optionally conducting a pressurized bubble-dissolving operation.

The above substrate, as defined previously, may include a flexible circuit board, a wafer, a display or a touch panel or the like.

The above laminating process includes roller lamination, hot press, vacuum lamination or vacuum press.

Preferably, the above step (a) may be performed in a roll-to-roll manner. A roll-to-roll operation, which is known to a person of ordinary skill in the art, refers to the steps of drawing out a sample from a rolled-up material, processing the sample, and winding the processed sample in a roller. For example, as shown in FIG. 1, a substrate A is drawn out from a roll of the substrate A, laminated with a dry film from a dry film roll 1 by using rollers 2 and 3, and then wound to form a product B. Therefore, the dry film of the present invention may be laminated to the substrate by a continuous process, which is favorable for simplifying the process and speeding up the process.

In order to achieve that, without a vacuum lamination apparatus, undesired gas between the substrate and the resin layer can be rapidly dissolved into the resin layer, the above step (b) may be performed by using a pressurized bubble-dissolving operation well known to a person of ordinary skill in the art. For example, the carrier on which the dry film has been applied is preferably wound into a roll and then the whole roll is delivered into an autoclave to dissolve the bubbles. The pressurization is preferably carried our at a temperature between 30° C. and 100° C. and a pressure between 2 atm and 10 atm for 10 to 60 minutes.

Since the dry film of the present invention contains a solvent having a gas-dissolving effect, undesired gas remaining between the substrate and the polyimide layer may be dissolved in the polyimide layer during lamination of the polyimide layer to the substrate. Therefore, it will effectively improve quality of final products. In addition, the air dissolved in the polyimide layer may be removed in subsequent processing steps, such as exposure, baking and development, or may be optionally removed by using additional processing steps such as heating. For example, a desired pattern may be formed on a dry film through the steps such as exposure, baking (for example, at 80° C.-100° C. for 5 minutes to 20 minutes) and development after the limitation of the dry film to a circuit board; then, a polyimide precursor is cyclized and polymerized to a polyimide through heating. In such steps (especially the step of baking and/or heating), the air dissolved in the polyimide layer may be removed together with volatilization of the solvent.

Application of the Dry Film of the Present Invention

The dry film of the present invention may be laminated to a substrate, such as a printed circuit board, a wafer, a display or a touch panel, by using general lamination techniques, without a vacuum lamination apparatus. Therefore, as compared to the prior art, the lamination of the dry film of the present invention can be carried out through simpler steps by using an apparatus that is more easily available. Overall, the present invention is more cost-effective than the prior art which adopts a vacuum lamination apparatus or another processing apparatus.

Additionally, the dry film of the present invention may, without the use of a vacuum lamination apparatus, effectively reduce the amount of the gas existing between the resin layer and the substrate, thereby improving the quality of the products.

EXAMPLES

Synthesis Example 1: Photosensitive Polyimide Precursor Resin PI-1

21.81 g (0.1 mol) pyromellitic dianhydride (referred to hereinafter as "PMDA") was dissolved in 200 g N-methyl- 2-pyrrolidone (referred to hereinafter as "NMP"). The mixture obtained was then heated up to 50° C. and agitated for reaction over 2 hours 1.161 g (0.01 mol) 2-hydroxyethyl acrylate (referred to hereinafter as "HEA") was slowly added and then the mixture was agitated for reaction over 2 hours at a fixed temperature of 50° C. Then, 20.024 g (0.1 mol) 4,4'-oxydianiline (referred to hereinafter as "ODA") was added to the solution, and after complete dissolution, it was further agitated for reaction over 6 hours at a fixed temperature of 50° C. to form a photosensitive polyimide precursor resin PI-1, in which the solid content is about 17 wt %. The solid content is the weight percentage of non-volatile materials in PI-1 and can be obtained, for example, by: baking the resin at 250° C. or 300° C. for 1 hour, measuring the weight difference of the resin before and after baking so as to obtain the actual weight of non-volatile materials, and calculating the weight percentage of the non-volatile material in PI-1.

Synthesis Example 2: Photosensitive Polyimide Precursor Resin PI-2

21.81 g (0.1 mol) PMDA was dissolved in 200 g NMP. The mixture obtained was then heated up to 50° C. and agitated for reaction over 2 hours. 13.01 g (0.01 mol) 2-hydroxyethyl methacrylate (referred to hereinafter as "HEMA") was slowly added and then the mixture was agitated for reaction over 2 hours at a fixed temperature of 50° C. Then, 20.024 g (0.1 mol) ODA was added to the solution, and after complete dissolution and it was further agitated for reaction over 6 hours at a fixed temperature of 50° C. to form a photosensitive polyimide precursor resin PI-2, in which the solid content is about 21 wt %.

Synthesis Example 3: Photosensitive Polyimide Precursor Resin PI-3

21.81 g (0.1 mol) PMDA was dissolved in 200 g NMP. The mixture obtained was then heated up to 50° C. and agitated for reaction over 2 hours. 0.601 g (0.01 mol) isopropanol was slowly added, and then agitated for reaction over 2 hours at a fixed temperature of 50° C. Then, 32.02 g (0.1 mol) 2,2'-bis(trifluoromethyl) benzidine (referred to hereinafter as "TFMB") was added to the solution, and after complete dissolution, it was further agitated for reaction over 6 hours at a fixed temperature of 50° C. to form a photosensitive polyimide resin precursor PI-3, in which the solid content is about 21 wt %.

Synthesis Example 4: Carboxyl Group-Containing Soluble Polyimide PI-4

43.62 g (0.2 mol) PMDA and 30.43 g (0.2 mol) 3,5-diamino benzoic acid (referred to hereinafter as "DABA") were provided and mixed with 300 mL NMP. The mixture obtained was agitated for 1 hour at room temperature. Then, the mixture was heated up to 50° C. and agitated for 4 hours. After 4 hours, 50 mL toluene was added. Water was removed by a dean-stark device at 150° C. Toluene was removed after the completion of water removal and a carboxyl group-containing polyimide solution PI-4, in which the solid content is about 19 wt %, was obtained.

Synthesis Example 5: Soluble Polyimide PI-5 Having Carboxyl Group Modified by Isocyanate 370 g PI-4 was provided and mixed with 1.4 g 1-methylimidazole (referred to hereinafter as "1-MI"), 15.5 g 2-isocyanatoethyl methacrylate (referred to hereinafter as "IEM") and 0.1 g phenothiazine (referred to hereinafter as "PTZ"). The mixture was agitated for 1 hour at room temperature. After 1 hour, the mixture was heated up to 60° C. and agitated for 6 hours to obtain a soluble polyimide PI-5 having carboxyl group modified by isocyanate, in which the solid content is about 19 wt %.

Synthesis Example 6: Hydroxyl Group-Containing Soluble Polyimide PI-6

88.85 g (0.2 mol) 4,4'-(Hexafluoroisopropylidene)diphthalic anhydride (referred to hereinafter as "6FDA") and 57.26 g (0.2 mol) (2,2-bis(3-amino-4-hydroxyphenyl)propane (referred to hereinafter as "BAPA") were provided and mixed with 300 mL NMP. The mixture obtained was agitated for 1 hour at room temperature. Then, the mixture was heated up to 50° C. and agitated for 4 hours. After 4 hours, 50 mL toluene was added. Water was removed by a dean-stark device at 150° C. After the completion of water removal and toluene removal, a hydroxyl group-containing polyimide solution PI-6 was obtained, in which the solid content is about 32 wt %.

Synthesis Example 7: Soluble Polyimide PI-7 Having Hydroxyl Group Modified by Isocyanate 440 g PI-6 was provided and mixed with 1.67 g 1-MI, 36.86 g IEM and 0.12 g PTZ. The mixture was agitated for 1 hour at room temperature. After 1 hour, the mixture was heated up to 60° C. and agitated for 6 hours to obtain a soluble polyimide PI-7 having hydroxyl group modified by isocyanate, in which the solid content is about 37 wt %.

Synthesis Example 8: Soluble Polyimide PI-8 Having Carboxyl Group Modified by Diisocyanate 370 g PI-4 was provided and mixed with 1.4 g 1-MI, 13.01 g HEMA, 14.01 g tetramethylene diisocyanate (referred to hereinafter as "TMDC") and 0.1 g PTZ. The mixture was agitated for 1 hour at room temperature. After 1 hour, the mixture was heated up to 60° C. and agitated for 6 hours to obtain a soluble polyimide PI-8 having carboxyl group modified by diisocyanate, in which the solid content is about 24 wt %.

Synthesis Example 9: Polyimide PI-9 Having Hydroxyl Group Modified by Diisocyanate 440 g PI-6 was provided and mixed with 1.67 g 1-MI, 13.01 g HEMA 14.01 g TMDC and 0.12 g PTZ. The mixture was agitated for 1 hour at room temperature. After 1 hour, the mixture was heated up to 60° C. and agitated for 6 hours to obtain a polyimide PI-9 having hydroxyl group modified by diisocyanate, in which the solid content is about 36 wt %.

The abbreviations used in the following examples are defined below.

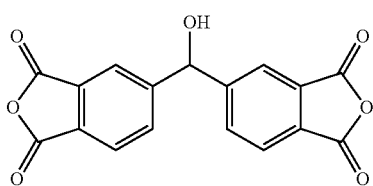

DA1

41
-continued

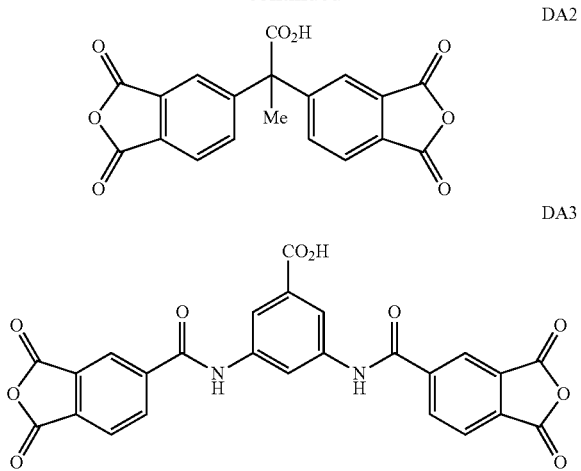

Synthesis Example 10: isocyanate-Modified Soluble Polyimide PI-10

64.85 g (0.2 mol) DA1 and 42.46 g (0.2 mol) 2,2'-dimethylbiphenyl-4,4'-diamine (referred to hereinafter as "DMDB") were provided and mixed with 300 mL NMP. The mixture was agitated for 1 hour at room temperature. Then, the mixture was heated up to 50° C. and agitated for 4 hours. After 4 hours, 50 mL toluene was added. Water was removed by a dean-stark device at 130° C. After the completion of water removal and toluene removal, the solution was cooled to room temperature. 7 g (0.05 mol) 2-isocyanatoethyl acrylate (referred to hereinafter as "2-IEA"), 0.05 g 1-MI and 0.06 g PTZ were added. The solution was heated up to 80° C. and agitated for 8 hours to obtain an isocyanate-modified soluble polyimide PI-10, in which the solid content is about 27 wt %.

Synthesis Example 11: isocyanate-Modified Polyimide PI-11

73.256 g (0.2 mol) DA2 and 42.46 g (0.2 mol) DMDB were provided and mixed with 350 mL NMP. The mixture was agitated for 1 hour at room temperature. Then, the mixture was heated up to 50° C. and agitated for 4 hours. After 4 hours, 50 mL toluene was added. Water was removed by a dean-stark device at 130° C. After the completion of water removal and toluene removal, the solution was cooled to room temperature. 7 g (0.05 mol) 2-IEA, 0.05 g 1-MI and 0.06 g PTZ were added. The solution was heated up to 80° C. and agitated for 8 hours to obtain an isocyanate-modified polyimide PI-11, in which the solid content is about 26 wt %.

Synthesis Example 12: ISOCYANATE-MODIFIED POLYIMIDE PI-12

100.074 g (0.2 mol) DA3 and 42.46 g (0.2 mol) DMDB were provided and mixed with 450 mL NMP. The mixture was agitated for 1 hour at room temperature. Then, the mixture was heated up to 50° C. and agitated for 4 hours. After 4 hours, 50 mL toluene was added. Water was removed by a dean-stark device at 130° C. After the completion of water removal and toluene removal, the solution was cooled to room temperature. 7 g (0.05 mol) 2-IEA, 0.05 g 1-MI and 0.06 g PTZ were added. The solution was heated up to 80° C. and agitated for 8 hours to obtain an isocyanate-modified polyimide PI-12, in which the solid content is about 24 wt %.

Synthesis Example 13: Hydroxyl Group-Containing Soluble Polyimide PI-13

88.85 g (0.2 mol) 6FDA, 28.63 g (0.1 mol) BAPA and 23.03 g (0.1 mol) bis(4-aminophenoxy)methane (referred to hereinafter as "MEMG") were provided and mixed with 300 mL NMP. The mixture was agitated for 1 hour at room temperature. Then, the mixture was heated up to 50° C. and agitated for 4 hours. After 4 hours, 50 mL xylene was added. Water was removed by a dean-stark device at 150° C. After the completion of water removal and xylene removal, a hydroxyl group-containing polyimide PI-13 is obtained, in which the solid content is about 31 wt %.

Synthesis Example 14: Epoxy-Modified Soluble Photosensitive Polyimide PI-14

140.5 g polyimide PI-13 obtained from Example 13 was provided and added with 6.11 g (0.05 mol) glycidyl methacrylate (referred to hereinafter as "GMA"), 0.015 g tetrabutylammonium bromide (referred to hereinafter as "TBAB") and 0.06 g hydroquinone monomethyl ether (referred to hereinafter as "MEHQ"). The mixture was then heated up to 90° C. and agitated for 12 hours to obtain a soluble photosensitive polyimide PI-14, in which the solid content is about 31 wt %.

Synthesis Example 15: —COOH Group-Containing Soluble Polyimide PI-15

100.074 g (0.2 mol) DA3 and 42.46 g (0.2 mol) DMDB were provided and mixed with 450 mL NMP. The mixture was agitated for 1 hour at room temperature. Then, the mixture was heated up to 50° C. and agitated for 4 hours. After 4 hours, 50 mL toluene was added. Water was removed by a dean-stark device at 130° C. After the completion of water removal and toluene removal, a COOH group-containing polyimide PI-15 was obtained, in which the solid content is about 24 wt %.

Synthesis Example 16: Epoxy-Modified Soluble Photosensitive Polyimide PI-16

142.5 g PI-15 obtained from Example 15 was provided and added with 6.11 g (0.05 mol) GMA, 0.015 g TBAB and 0.06 g MEHQ. The mixture was then heated up to 90° C. and agitated for 12 hours to obtain an epoxy-modified soluble photosensitive polyimide PI-16, in which the solid content is about 25 wt %.

Synthesis Example 17: Photosensitive Polyimide Precursor Resin PI-17

2.181 g (0.01 mol) PMDA was dissolved in 200 g NMP, and the solution was heated to 50° C. and agitated for 2 hours. 1.161 g (0.01 mol) HEA was slowly added and then agitated for reaction over 2 hours at a fixed temperature of 50° C. Then, 18.018 g (0.09 mol) ODA was added to the solution, and after complete dissolution, 18.0216 g (0.09 mol) PMDA was added. The mixture was further agitated for reaction over 6 hours at a fixed temperature of 50° C. 2.0024 g (0.01 mol) ODA was added. The mixture was agitated for 1 hour to obtain a photosensitive polyimide precursor resin PI-17, in which the solid content is about 17 wt %.

Synthesis Example 18: Amine Group-Containing Polyimide Solution PI-18

32.023 g (0.1 mol) TFMB and 39.98 g (0.09 mol) 6FDA were provided and mixed with 300 mL NMP. The mixture was agitated for 1 hour at room temperature. Then, the mixture was heated up to 50° C. and agitated for 4 hours. After 4 hours, 50 mL toluene was added. Water was removed by a dean-stark device at 150° C. After the completion of water removal and toluene removal, an amine group-containing polyimide solution PI-18 was obtained, in which the solid content is about 19 wt %.

Synthesis Example 19: Polyimide Solution PI-19

32.023 g (0.1 mol) TFMB and 0.9806 g (0.02 mol) maleic anhydride were provided and mixed with 300 mL NMP. The mixture was agitated for 1 hour at room temperature. 39.98 g (0.09 mol) 6FDA was added, and the mixture was then heated up to 50° C. and agitated for 4 hours. After 4 hours, 50 mL toluene was added. Water was removed by a dean-stark device at 150° C. After the completion of water removal and toluene removal, a polyimide solution PI-19 was obtained, in which the solid content is about 19 wt %.

Synthesis Example 20: Polyimide Solution PI-20

32.023 g (0.1 mol) TFMB and 4.9646 g (0.02 mol) 4-phenylethynylphthalic anhydride were provided and mixed with 300 mL NMP. The mixture was agitated for 1 hour at room temperature. 39.98 g (0.09 mol) 6FDA was added, and the mixture was then heated up to 50° C. and agitated for 4 hours. After 4 hours, 50 mL toluene was added. Water was removed by a dean-stark device at 150° C. After the completion of water removal and toluene removal, a polyimide solution PI-20 was obtained, in which the solid content is about 20 wt %.

Synthesis Example 21: Polyimide Solution PI-21

32.023 g (0.1 mol) TFMB and 48.8664 g (0.11 mol) 6FDA were provided and mixed with 300 mL NMP. The mixture was agitated for 1 hour at room temperature and then heated up to 50° C. and agitated for 4 hours. After 4 hours, 50 mL toluene was added. Water was removed by a dean-stark device at 150° C. After the completion of water removal and toluene removal, a polyimide solution PI-21 was obtained, in which the solid content is about 20 wt %.

Synthesis Example 22: Acrylic Photosensitive Group-Containing Polyimide Solution PI-22

32.023 g (0.1 mol) TFMB and 48.8664 g (0.11 mol) 6FDA were provided and mixed with 300 mL NMP. The mixture was agitated for 1 hour at room temperature and then heated up to 50° C. and agitated for 4 hours. After 4 hours, 50 mL toluene was added. Water was removed by a dean-stark device at 150° C. After the completion of water removal and toluene removal, 2.322 g (0.02 mol) HEA was added at 50° C., and the mixture was agitated for 4 hours to obtain an acrylic photosensitive group-containing polyimide solution PI-22, in which the solid content is about 21 wt %.

Synthesis Example 23: Polyimide Solution PI-23

32.023 g (0.1 mol) TFMB and 48.8664 g (0.11 mol) 6FDA were provided and mixed with 300 mL NMP. The mixture was agitated for 1 hour at room temperature and then heated up to 50° C. and agitated for 4 hours. After 4 hours, 50 mL toluene was added. Water was removed by a dean-stark device at 150° C. After the completion of water removal and toluene removal, 0.02 mol 3-(phenylethynyl) aniline was added at 50° C., and the mixture was agitated for 4 hours to obtain a polyimide solution PI-23, in which the solid content is about 23 wt %.

Preparation of a Dry Film

A second solvent listed in Tables 1 to 6 was optionally added to 100 parts by weight of a polyimide precursor solution or a soluble polyimide solution prepared in Synthesis Examples 1-23. The amount of the second solvent added was as shown in each table. Then, each composition was respectively applied on a polyethylene terephthalate (PET) carrier evenly by using a blade coater, and baked in an oven. Baking temperature and time are respectively shown in each table. Thus, a dry film comprising a coating of the polyimide precursor or a coating of the soluble polyimide was obtained; the thickness of the coating was about 20 μm. Prior to coating, the amount of the first solvent and the amount of the second solvent added (parts by weight) were based on per 100 parts by weight of the polyimide precursor solution or the soluble polyimide solution. While after drying, the amount of the first solvent and the amount of the second solvent (wt %) were based on the total weight of the resin layer.

Test of the Dry Film

The above dry film was tested for solvent content and physical properties, including tests with respect to surface stickiness, glass transition temperature (Tg), lamination, etc. Each of the tests are described below:

Test of Solvent Content 0.01 g polyimide precursor coating or soluble polyimide coating (the PET carrier is not included) was taken and dissolved in dimethyl sulfoxide (DMSO). A 7890GC gas chromatograph manufactured by Agilent Technologies Co., Ltd., with the column model: DB1701 (0.53 mm, 30 mm, 1.5 um) was used to implement quantitative gas chromatography.

Test of Surface Stickiness

A 20*20 cm dry film was taken and gently placed on a 30*30 cm copper foil with the polyimide layer of the dry film facing the copper foil such that the polyimide layer of the dry film was completely covered with the copper foil. After 30 seconds, the dry film was released from the copper foil so as to observe the percentage of the dry film remained on the surface of the copper foil. No residual was denoted as 0, total remained was denoted as 10, 0-10% residual was denoted as 1, and so forth.

Measurement of Tg

Tg of the dry films was measured using a thermal mechanical analyzer (TMA, a TA Q400 instrument manufactured by Texas Instruments Incorporated). The measurement range was between −50° C. and 100° C., and the temperature was increased at 10° C./min.

Test of Lamination

A 20*20 cm dry film was taken and laminated on a copper clad laminate having circuit formed thereon by using hot rollers at a temperature of 80° C. with 3 kgf/cm² pressure, the polyimide layer of the dry film facing toward the copper clad laminate. The copper clad laminate has a linewidth of L/S=30/30 μm. After 4 hours standing, conditions of bubbles were then observed and classified into 10 grades according to the residual rate of bubbles, in which 0 indicates that the residual rate of bubbles is 0%. 10 indicates that the residual rate of bubbles is 100%, 1 indicates that the residual rate of bubbles is 0-10%, and so forth.

Pressurization Test

A 20*20 cm dry film was taken and laminated to a copper clad laminate having circuit formed thereon by using hot rollers at a temperature of 80° C. with 3 kgf/cm² pressure, the polyimide layer of the dry film facing toward the copper clad laminate. The copper clad laminate has a linewidth of L/S=30/30 μm. Then, it was put into an autoclave under pressurization condition of 50° C./5 atm/30 min. Conditions of bubbles were observed after pressurization and classified into 10 grades according to residual rate of the bubbles, in which 0 indicates that the residual rate of bubbles is 0%, 10 indicates that the residual rate of bubbles is 100%, 1 indicates that the residual rate of bubbles is 0-10%, and so forth.

Test of Re-bubbling

After carrying out the pressurized bubble-removing operation, the film (20*20 cm) was placed at environmental conditions of 25° C. and 50-70% RH for 24 hours. After 24 hours, conditions of bubbles were observed using an optical microscope and classified into 10 grades according to appearance rate of bubbles, in which 0 indicates that the appearance rate of bubbles is 0%, 10 indicates that the appearance rate of bubbles is 100%, 1 indicates that the appearance rate of bubbles is 0-10%, and so forth.

Test of Excessive Glue (Bleeding)

After carrying out the pressurized bubble-removing operation, the film (20*20 cm) was observed using an optical microscope to evaluate the bleeding issue at the edges of an openings or at the edges of the film. When the glue flows over the edge of the opening in a distance of 0.5 mm, "bleeding issue" occurs.

The test results of the examples were shown in Tables 1 to 6.

TABLE 1

|  | polyimide precursor/ soluble PI | baking condition (° C./ mins) | total amount of solvent in a dried dry film (wt %) | surface sticki- ness | test of lamination (grade: residual rate of bubbles) |
|---|---|---|---|---|---|
| Example 1-1 | PI-1 | 120/10 | 0.9 | 0 | 10 |
| Example 1-2 | PI-1 | 120/7 | 4.9 | 0 | 10 |
| Example 1-3 | PI-1 | 110/10 | 10.3 | 0 | 8 |
| Example 1-4 | PI-1 | 110/5 | 15.1 | 0 | 8 |
| Example 1-5 | PI-1 | 95/7 | 20.7 | 0 | 8 |
| Example 1-6 | PI-1 | 85/5 | 30.5 | 0 | 7 |
| Example 1-7 | PI-1 | 75/3 | 39.7 | 1 | 7 |
| Example 1-8 | PI-1 | 65/5 | 49.5 | 2 | 7 |
| Example 1-9 | PI-1 | 55/3 | 64.9 | 10 | 7 |

TABLE 2

|  | polyimide precursor of soluble PI | second solvent | amount of first solvent added before coating (parts by weight) | amount of second solvent added before coating (parts by weight) | baking condition (° C./ mins) | amount of first solvent after drying (wt %) | amount of second solvent after drying (wt %) | sur- face sticki- ness | test of lami- nation (grade: residual rate of bubbles) |
|---|---|---|---|---|---|---|---|---|---|
| Example 1-10 | PI-1 |  |  | 83 | 8 | 120/8 | 1.2 | 3.7 | 0 | 10 |
| Example 1-11 | PI-1 | GT | 83 | 8 | 110/12 | 3.5 | 6.9 | 0 | 7 |
| Example 1-12 | PI-1 |  | 83 | 8 | 110/7 | 7.9 | 7.1 | 0 | 6 |
| Example 1-13 | PI-1 |  | 83 | 8 | 95/8 | 11.7 | 7.2 | 0 | 6 |
| Example 1-14 | PI-1 |  | 83 | 8 | 85/6 | 24.1 | 7.5 | 0 | 5 |
| Example 1-15 | PI-1 |  | 83 | 8 | 75/4 | 32.5 | 7.6 | 1 | 5 |
| Example 1-16 | PI-1 |  | 83 | 8 | 65/6 | 44.3 | 7.7 | 2 | 4 |
| Example 1-17 | PI-1 |  | 83 | 8 | 55/4 | 58.5 | 7.9 | 10 | 3 |

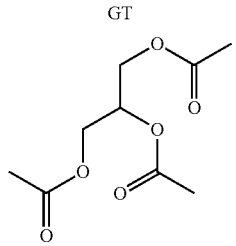

TABLE 3

| | polyimide precursor or soluble PI | second solvent | amount of first solvent before coating (parts by weight) | amount of second solvent added before coating (parts by weight) | baking condition (° C./mins) | amount of first solvent after drying (wt %) | amount of second solvent after drying (wt %) | surface stickiness | test of lamination (grade: residual rate of bubbles) |
|---|---|---|---|---|---|---|---|---|---|
| Example 1-18 | PI-1 | | 83 | 2 | 120/10 | 0 | 4.9 | 0 | 10 |
| Example 1-19 | PI-1 | NOP 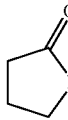 | 83 | 4 | 75/5 | 38.1 | 2.2 | 0 | 6 |
| Example 1-20 | PI-1 | | 83 | 6 | 75/6 | 36.9 | 3.1 | 0 | 5 |
| Example 1-21 | PI-1 | | 83 | 10 | 75/7 | 34.7 | 5.5 | 0 | 4 |
| Example 1-22 | PI-1 | | 83 | 15 | 85/5 | 31.1 | 10.3 | 0 | 3 |
| Example 1-23 | PI-1 | | 83 | 25 | 85/10 | 20.2 | 21.1 | 0 | 2 |
| Example 1-24 | PI-1 | | 83 | 35 | 95/7 | 10.5 | 29.8 | 0 | 2 |
| Example 1-25 | PI-1 | | 83 | 45 | 95/10 | 1.1 | 39.1 | 0 | 1 |
| Example 1-26 | PI-1 | | 83 | 50 | 100/8 | 0.3 | 44.5 | 2 | 1 |
| Example 1-27 | PI-1 | | 83 | 55 | 100/10 | 0.2 | 49.3 | 5 | 1 |

TABLE 4

| | polyimide precursor or soluable PI | second solvent | amount of first solvent before coating (parts by weight) | amount of second solvent added before coating (parts by weight) | baking condition (° C./mins) | amount of first solvent after drying (wt %) | amount of second solvent after drying (wt %) | surface stickiness | test of lamination (grade: residual rate of bubbles) |
|---|---|---|---|---|---|---|---|---|---|
| Example 2-1 | PI-2 | NA | 79 | 0 | 70/8 | 37 | 0 | 0 | 5 |
| Example 2-2 | PI-2 | GT | 79 | 4 | 70/10 | 29 | 7.1 | 0 | 1 |
| Example 3-1 | PI-3 | NA | 79 | 0 | 70/7.5 | 39 | 0 | 0 | 5 |
| Example 3-2 | PI-3 | GT | 79 | 4 | 70/9.5 | 31 | 6.9 | 0 | 1 |
| Example 5-1 | PI-5 | NA | 81 | 0 | 70/5 | 36 | 0 | 1 | 6 |
| Example 5-2 | PI-5 | GT | 81 | 4 | 70/6.5 | 28 | 7.8 | 0 | 2 |
| Example 7-1 | PI-7 | NA | 63 | 0 | 60/5 | 34 | 0 | 2 | 6 |
| Example 7-2 | PI-7 | GT | 63 | 4 | 60/7 | 25 | 6.1 | 0 | 2 |
| Example 8-1 | PI-8 | NA | 76 | 0 | 65/5 | 30 | 0 | 1 | 6 |
| Example 8-2 | PI-8 | GT | 76 | 4 | 65/6.5 | 23 | 7.7 | 0 | 2 |
| Example 9-1 | PI-9 | NA | 64 | 0 | 60/5 | 29 | 0 | 0 | 6 |
| Example 9-2 | PI-9 | GT | 64 | 4 | 65/5 | 21 | 6.3 | 0 | 2 |
| Example 10-1 | PI-10 | NA | 73 | 0 | 60/7 | 37 | 0 | 2 | 6 |
| Example 10-2 | PI-10 | GT | 73 | 4 | 65/5 | 21 | 7.4 | 1 | 2 |
| Example 11-1 | PI-11 | NA | 74 | 0 | 60/7 | 36 | 0 | 3 | 6 |
| Example 11-2 | PI-11 | GT | 74 | 4 | 65/5 | 23 | 7.5 | 1 | 2 |
| Example 12-1 | PI-12 | NA | 76 | 0 | 60/7 | 34 | 0 | 3 | 6 |
| Example 12-2 | PI-12 | GT | 76 | 4 | 65/5 | 20 | 8.1 | 0 | 2 |
| Example 14-1 | PI-14 | NA | 69 | 0 | 60/5 | 29 | 0 | 2 | 6 |
| Example 14-2 | PI-14 | GT | 69 | 4 | 60/7 | 20 | 7.1 | 1 | 2 |
| Example 16-1 | PI-16 | NA | 73 | 0 | 60/7 | 31 | 0 | 3 | 6 |
| Example 16-2 | PI-16 | GT | 73 | 4 | 65/5 | 19 | 7.9 | 1 | 2 |
| Example 17-1 | PI-17 | NA | 83 | 0 | 75/5 | 35 | 0 | 1 | 5 |
| Example 17-2 | PI-17 | GT | 83 | 4 | 80/5 | 27 | 8.1 | 0 | 1 |
| Example 18-1 | PI-18 | NA | 81 | 0 | 70/3 | 33 | 0 | 1 | 6 |
| Example 18-2 | PI-18 | GT | 81 | 4 | 70/5 | 23 | 8.7 | 0 | 2 |
| Example 19-1 | PI-19 | NA | 81 | 0 | 70/3 | 34 | 0 | 1 | 6 |
| Example 19-2 | PI-19 | GT | 81 | 4 | 70/5 | 22 | 8.1 | 0 | 2 |
| Example 20-1 | PI-20 | NA | 80 | 0 | 70/3 | 33 | 0 | 1 | 6 |
| Example 20-2 | PI-20 | GT | 80 | 4 | 70/5 | 23 | 8.5 | 0 | 3 |
| Example 21-1 | PI-21 | NA | 80 | 0 | 70/3 | 35 | 0 | 1 | 6 |
| Example 21-2 | PI-21 | GT | 80 | 4 | 70/5 | 24 | 8.1 | 0 | 3 |
| Example 22-1 | PI-22 | NA | 79 | 0 | 70/3 | 37 | 0 | 1 | 6 |
| Example 22-2 | PI-22 | GT | 79 | 4 | 70/5 | 25 | 7.9 | 0 | 3 |
| Example 23-1 | PI-23 | NA | 77 | 0 | 65/5 | 36 | 0 | 0 | 6 |
| Example 23-2 | PI-23 | GT | 77 | 4 | 65/7 | 21 | 7.9 | 0 | 3 |

TABLE 5
| | polyimide precursor or soluble PI | second solvent |
|---|---|---|
| Example 17-3 | PI-17 | 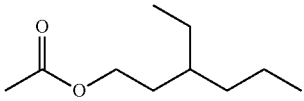 |
| Example 17-4 | PI-17 | 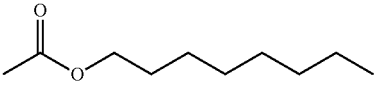 |
| Example 17-5 | PI-17 | 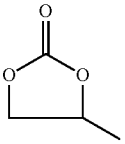 |
| Example 17-6 | PI-17 | 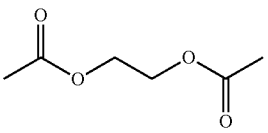 |
| Example 17-7 | PI-17 | 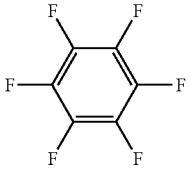 |
| Example 17-8 | PI-17 | hexadecane |
| Example 17-9 | PI-17 | 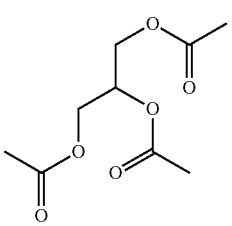 |
| Example 17-10 | PI-17 | 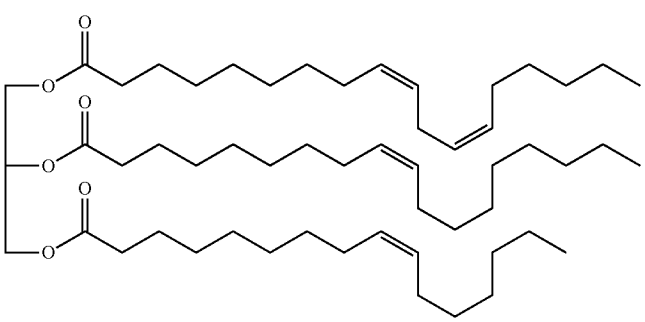 [SMILES: CCCCC/C=C\C/C=C\CCCCCCCC(=O)OCC(COC(=O)CCCCCCC/C=C\CCCCCC)OC(=O)CCCCCCC/C=C\CCCCCCCC] |
| Example 17-11 | PI-17 | 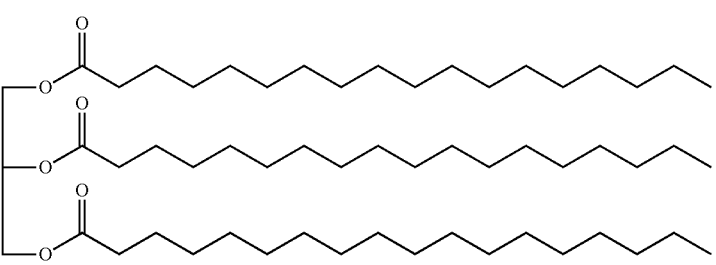 [SMILES: CCCCCCCCCCCCCCCCCC(=O)OCC(COC(=O)CCCCCCCCCCCCCCCCC)OC(=O)CCCCCCCCCCCCCCCCC] |

TABLE 5-continued

| | | |
|---|---|---|
| Example 17-12 | PI-17 | 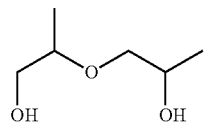 |
| Example 17-13 | PI-17 | 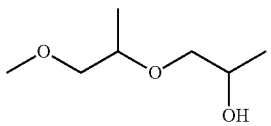 |
| Example 17-14 | PI-17 | Dioctyl ether |

| | amount of first solvent before coating (parts by weight) | amount of second solvent added before coating (parts by weight) | baking condition (° C./mins) | amount of first solvent after drying (wt %) | amount of second solvent after drying (wt %) | surface stickiness | test of lamination (grade: residual rate of bubbles) |
|---|---|---|---|---|---|---|---|
| Example 17-3 | 83 | 4 | 75/8 | 20 | 9.3 | 0 | 2 |
| Example 17-4 | 83 | 4 | 75/8 | 20 | 9.3 | 0 | 3 |
| Example 17-5 | 83 | 4 | 75/5 | 23 | 8.8 | 1 | 3 |
| Example 17-6 | 83 | 4 | 70/10 | 21 | 7.9 | 0 | 3 |
| Example 17-7 | 83 | 4 | 70/8 | 22 | 5.6 | 0 | 2 |
| Example 17-8 | 83 | 4 | 65/9 | 20 | 6.1 | 0 | 2 |
| Example 17-9 | 83 | 4 | 80/5 | 27 | 8.1 | 0 | 1 |
| Example 17-10 | 83 | 4 | 80/5 | 27 | 9.5 | 0 | 1 |
| Example 17-11 | 83 | 4 | 80/5 | 28 | 9.6 | 0 | 1 |
| Example 17-12 | 83 | 4 | 70/10 | 29 | 8 | 2 | 6 |
| Example 17-13 | 83 | 4 | 70/9 | 27 | 7.5 | 1 | 6 |
| Example 17-14 | 83 | 4 | 80/6 | 20 | 10 | 0 | 6 |

TABLE 6

| | polyimide precursor or soluble PI | second solvent | amount of first solvent 1 before coating (parts by weight) | amount of second solvent 2 added before coating (parts by weight) | baking condition (° C./mins) | amount of solvent 1 after drying (wt %) | amount of solvent 2 after drying (wt %) | surface stickiness | Test of Pressurization Test (grade: residual rate of bubbles) | Test of Rebubbling (grade: residual rate of bubbles) | Test of Excessive Glue (bleeding) |
|---|---|---|---|---|---|---|---|---|---|---|---|
| Example 1-28 | PI-1 | GT | 83 | 5 | 110/12 | 6.5 | 3.1 | 0 | 3 | 7 | NO |
| Example 1-29 | PI-1 | 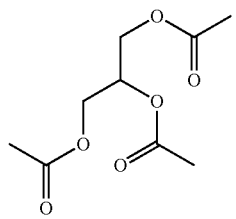 | 83 | 6 | 110/7 | 10.9 | 4.3 | 0 | 2 | 5 | NO |
| Example 1-30 | PI-1 | | 83 | 7 | 95/8 | 14.7 | 5.9 | 0 | 1 | 3 | NO |
| Example 1-31 | PI-1 | | 83 | 8 | 85/6 | 24.1 | 7.5 | 0 | 0 | 0 | NO |
| Example 1-32 | PI-1 | | 83 | 9 | 75/4 | 32.5 | 8.3 | 0 | 0 | 0 | NO |
| Example 1-33 | PI-1 | | 83 | 11 | 55/6 | 51.3 | 10.1 | 9 | 1 | 3 | NO |
| Example 1-34 | PI-1 | | 83 | 14 | 55/4 | 53.5 | 13.7 | 10 | 1 | 3 | NO |

Table 1 shows the test results of surface stickiness and lamination with respect to dry films with different solvent contents. According to the results shown in Table 1, the dry film can provide a gas-dissolving effect when the solvent contained therein achieves a certain amount or above, which is beyond the expectation of the prior art. However, if the amount of solvent is too low (4.9 wt %), it cannot effectively remove bubbles; if the amount of solvent is too high (64.9 wt %), surface stickiness occurs.

Tables 2-6 relate to dry films obtained by adding another solvent which has a better gas-dissolving effect to the resin composition.

Table 2 shows the test results of surface stickiness and lamination with respect to dry films in which the total amount of solvent after drying is different; the total amount of solvent in the dried dry films is respectively 4.9 wt %. 10.4 wt %. 15 wt %, 18.9 wt %, 31.6 wt %, 40.1 wt %, 52 wt %, and 56.4 wt %. In Examples 1-11 to 1-17, the second solvent in the dry film is substantially maintained at an amount between about 7 wt % to about 8 wt %. As shown in Table 2, the total amount of solvent in Example 1-10 is 4.9 wt %, the bubble-dissolving effect is not good. The dry films of Examples 1-14 and 1-16 have a better bubble-dissolving effect; however, the dry film of Example 1-16 does not have the same anti-sticky effect as the dry films in other examples since the total amount of solvent is up to 52 wt %, and the dry film of Example 1-17 has worse anti-sticky effect since the total amount of solvent is up to 66.4 wt %. In addition, through comparison between Table 1 (without second solvent) and Table 2, it may be shown that, with the same total amount of solvent, the dry films containing a second solvent show a lower residual rate of bubbles so they have a better bubble-dissolving effect. For example, in the dry films of Examples 1-5 and 1-13, the total amount of solvent is about 20 wt %; however, the residual rate of bubbles was classified as Grade 8 for Example 1-5 in which no second solvent was added while the residual rate of bubbles was lowered to Grade 6 for Example 1-13 in which a second solvent was added. It The result shows that the addition of a second solvent enhances the bubble-dissolving effect. Results of the comparison for related examples are listed in Table 7 below.

TABLE 7

|  | total amount of solvent in the dried dry film (wt %) | amount of second solvent in the dried dry film (wt %) | surface sticki-ness | test of lamination (grade: residual rate of bubbles) |
|---|---|---|---|---|
| Example 1-4 | 15.1 | — | 0 | 8 |
| Example 1-12 | 15 | 7.1 | 0 | 6 |
| Example 1-5 | 20.7 | — | 0 | 8 |
| Example 1-13 | 18.9 | 7.2 | 0 | 6 |
| Example 1-6 | 30.5 | — | 0 | 7 |
| Example 1-14 | 31.6 | 7.5 | 0 | 5 |
| Example 1-7 | 39.7 | — | 0 | 7 |
| Example 1-15 | 40.1 | 7.6 | 1 | 5 |
| Example 1-8 | 49.5 | — | 5 | 7 |
| Example 1-16 | 52 | 7.7 | 5 | 4 |

Examples 1-19 to 1-26 in Table 3 show the test results of surface stickiness and lamination with respect to dry films having different ratios of the first solvent amount to the second solvent amount after drying while the total amount of solvent therein is the same (about 40 wt %). As shown in Table 3, with the same total amount of solvent, the increase of the second solvent amount is beneficial to the reduction of the residual rate of bubbles. In Example 1-18 of Table 3, the amount of the second solvent is greater than 3 wt % but the total amount of the solvent is 4.9 wt % so the bubble-dissolving effect is not good. In Example 1-19 of Table 3, it can be known that with the same total amount of solvent (about 40 wt %), the effect of reducing the residual rate of bubbles will not be achieved when the amount of the second solvent after drying is less than 3 wt %, (in comparison with Example 1-15 of Table 2). When the amount of the second solvent after drying is between 3 wt % and 45 wt % (i.e., Examples 1-20 to 1-26), the residual rate of bubbles will be suddenly lowered to Grade 4, 3, 2, or even 1, which indicates that the bubble-dissolving effect can be effectively improved if the amount of the second solvent after drying is between 3 wt % and 45 wt %. In addition, in view of Example 1-27 of Table 3 (the total amount of solvent is about 50 wt %), it can be known that when the amount of the second solvent after drying exceeds 45 wt %, excessive glue (bleeding) occurs and the anti-sticky effect is not good.

Table 4 shows the test results of surface stickiness and lamination with respect to the dry films made of different polyimide precursors or soluble polyimides with or without the addition of the second solvent. In each example, the second solvent was added into the composition in an amount of 4 wt % prior to coating, and maintained between 6 wt % and 9 wt % after drying. A comprehensive view of the results of the examples shows that all of the dry films made of different polyimide precursors or soluble polyimides have a gas-dissolving effect and that the addition of the second solvent may further reduce the residual rate of bubbles in the dry film and thus a better effect can be obtained.

Table 5 shows the test results of surface stickiness and lamination with respect to the dry films containing different second solvents. A comprehensive view of the examples in Table 5 shows that all of the solvent-containing dry films of the present invention provide a gas-dissolving effect, and that selecting an appropriate second solvent can further improve the gas-dissolving effect. From the results of Examples 17-3 to 17-11 and Examples 17-12 to 17-14, it can be known that a second solvent belonging to ethers or alcohols has a higher residual rate of bubbles, which indicates that the second solvents belonging to ethers or alcohols has a less significant gas-dissolving effect than other second solvents such as substituted or unsubstituted alkanes or esters. Among the second solvents which are isomeric compounds, the second solvent with a branched chain (Example 17-3) has a better gas-dissolving effect than the second solvent with a straight chain (Example 17-4).

Table 6 relates to the dry films which were subjected to a pressurized bubble-dissolving operation after lamination. The results show that the solvent-containing dry film of the present invention can significantly reduce the residual rate of bubbles during the pressurized bubble-dissolving operation and obtain excellent effects. Example 1-31 of Table 6 differs from Example 1-14 of Table 2 only in the step of pressurized bubble-dissolving operation. The results indicate that Example 1-31 which adopts the step of pressurized bubble dissolving can lower the residual rate of bubbles to Grade 0. In addition, Table 6 also shows that in the case that the solvent in the dry film is present in a total amount of greater than 60 wt % after drying (Examples 1-33 and 1-34), even if the dry film has been subjected to a pressurized bubble-dissolving operation, the improvement on the residual rate of bubbles is limited or the anti-sticky effect is not good though the residual rate of bubbles is improved.

What is claimed is:
1. A solvent-containing dry film comprising a carrier and a resin layer, wherein the resin layer is a polyimide layer comprising:
(a) a polyimide precursor or a soluble polyimide; and
(b) a solvent,
wherein the solvent is present in a total amount of 25 wt % to 50 wt % based on the total weight of the resin layer; the solvent comprises a first solvent and a second solvent, wherein the first solvent is present in an amount of 1.5 wt % to 25 wt % based on the total weight of the resin layer and the second solvent is present in an amount of 7 wt % to 40 wt % based on the total weight of the resin layer;
wherein the first solvent is selected from the group consisting of dimethyl sulfoxide, diethyl sulfoxide, N,N-dimethyl-methanamide, N,N-diethyl-methanamide, N,N-dimethylacetamide, N-methyl-2-pyrrolidone, N-ethyl-2-pyrrolidone, phenol, o-cresol, m-cresol, p-cresol, xylenol, halogenated phenol, pyrocatechol, tetrahydrofuran, dioxane, dioxolane, propylene glycol monomethyl ether, tetraethylene glycol dimethyl ether, methanol, ethanol, butanol, 2-butoxyethanol, γ-butyrolactone, hexamethylphosphoramide, propylene glycol monomethyl ether acetate and a mixture thereof;
and wherein the second solvent is selected from the group consisting of

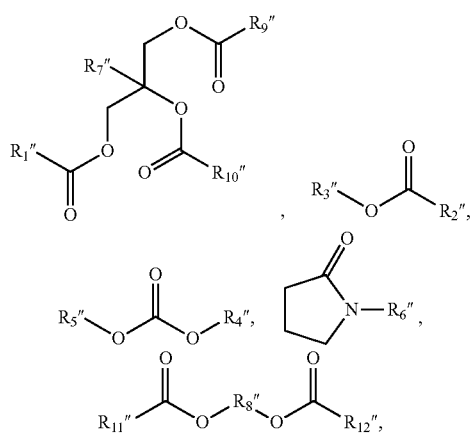

a perfluoro aromatic compound, a $C_2$-$C_{20}$ perfluoroalkane, tri-($C_1$-$C_6$ perfluoroalkyl)amine, a perfluoroether, and a combination thereof, wherein:

$R_1''$, $R_9''$ and $R_{10}''$ are each independently H, $C_1$-$C_{20}$ alkyl, $C_2$-$C_{20}$ alkenyl, or $C_2$-$C_{20}$ alkynyl;

$R_7''$ is H or a $C_1$-$C_3$ alkyl;

$R_2''$ is $C_1$-$C_{10}$ alkyl;

$R_3''$ is $C_2$-$C_{20}$ alkyl or $C_1$-$C_{10}$ alkyl-O—$C_1$-$C_{10}$ alkyl;

$R_4''$ and $R_5''$ are each independently $C_1$-$C_{10}$ alkyl;

$R_6''$ is $C_4$-$C_{15}$ alkyl;

$R_8''$ is $C_2$-$C_{20}$ alkyl; and $R_{11}''$ and $R_{12}''$ are each independently $C_1$-$C_{10}$ alkyl.

2. The solvent-containing dry film according to claim 1, wherein the solvent is present in a total amount of 25 wt % to 47 wt % based on the total weight of the resin layer.

3. The solvent-containing dry film according to claim 1, wherein the second solvent is selected from the group consisting of

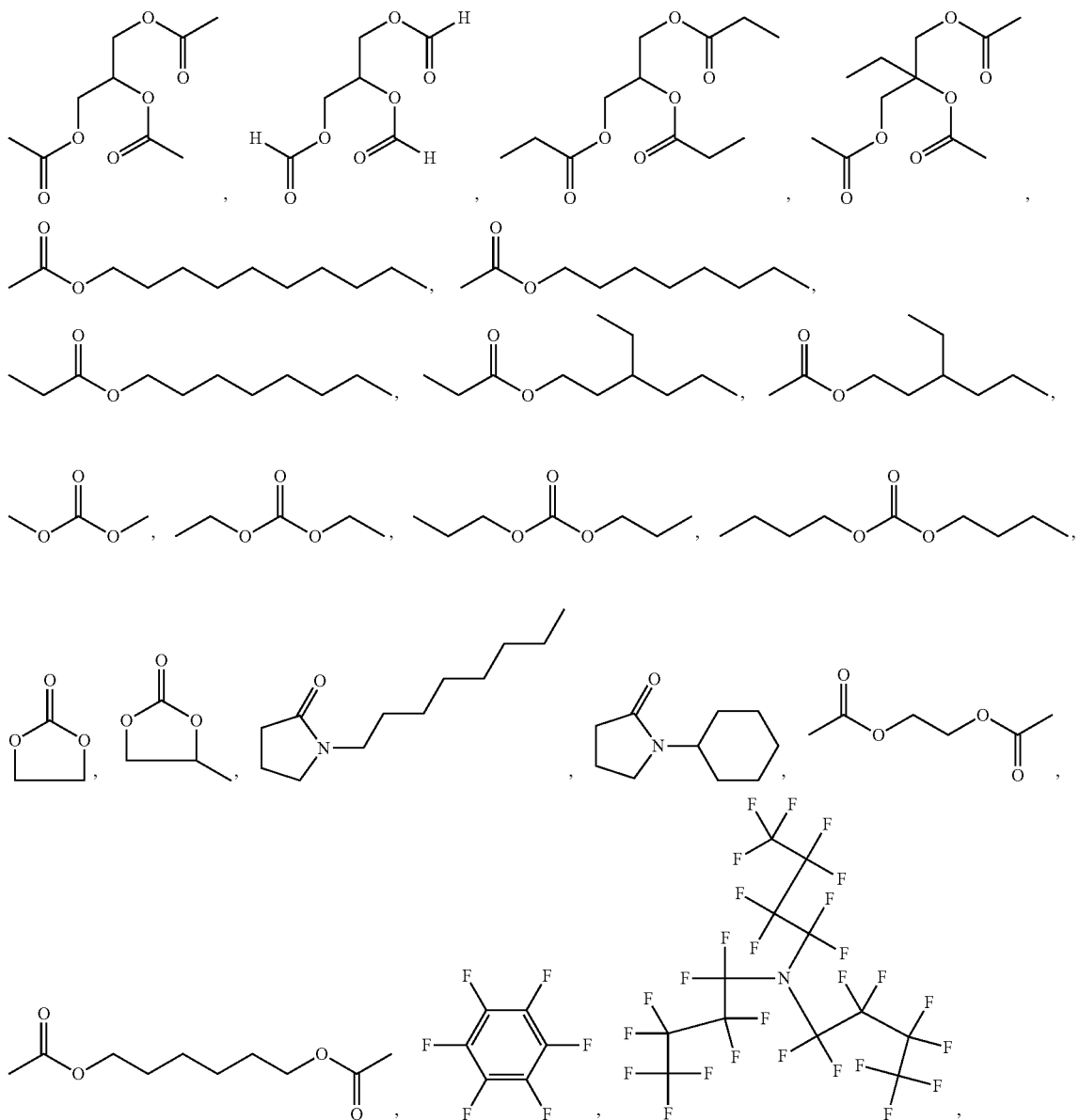

-continued
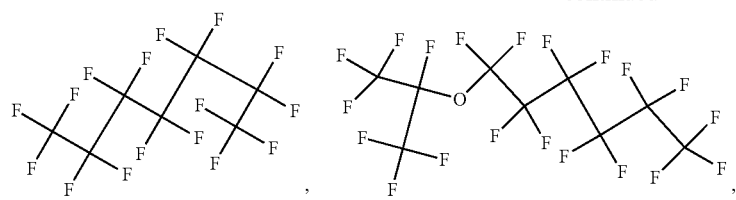
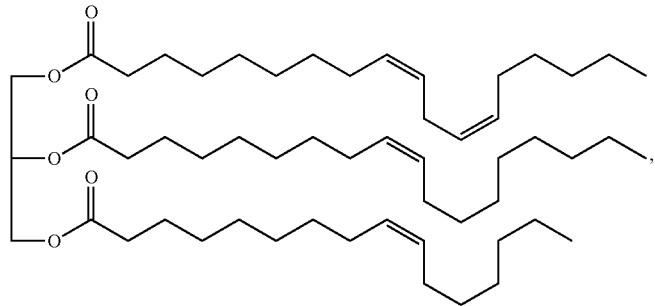
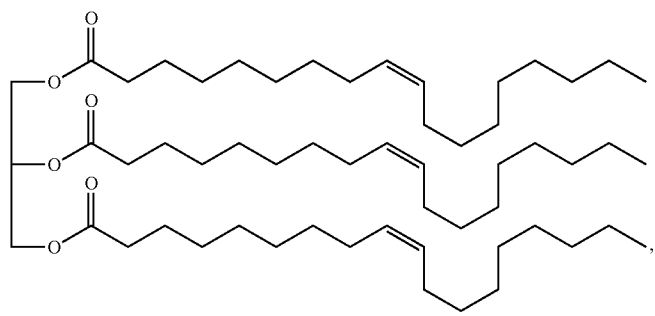
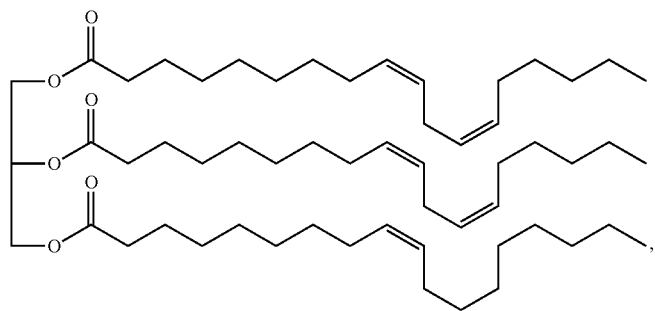
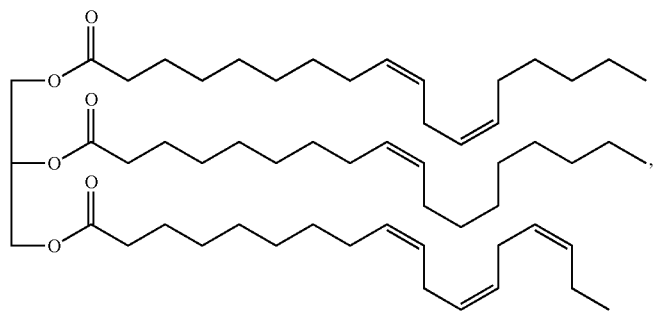

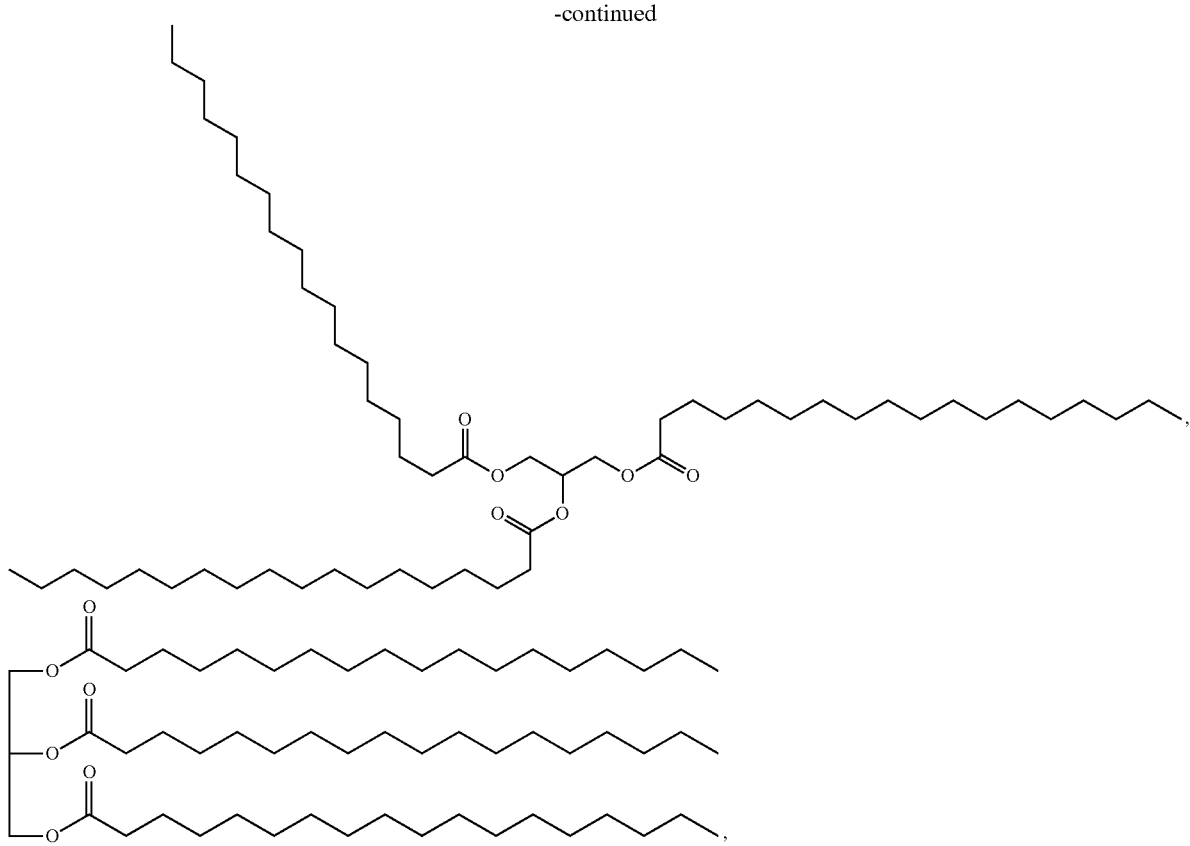

and a combination thereof.

4. A method for applying a solvent-containing dry film on a substrate, comprising:
laminating the solvent-containing dry film of claim 1 to the substrate in a manner that the resin layer of the solvent-containing dry film faces the substrate.

5. The method according to claim 4, wherein the laminating includes roller lamination, hot press, vacuum lamination or vacuum press.

6. The method according to claim 4, wherein the resin layer is laminated to the substrate by a continuous process.

7. The method according to claim 4, wherein the substrate is a printed circuit board, a wafer, a display or a touch panel.

* * * * *